US008209385B2

(12) United States Patent
Partaker et al.

(10) Patent No.: US 8,209,385 B2
(45) Date of Patent: Jun. 26, 2012

(54) MULTIMEDIA MOOD MESSAGES

(75) Inventors: Eric Partaker, London (GB); Richard Cole, London (GB); Natasha Sopieva, Hertfordshire (GB); Lauri Väin, Harju maakond (EE); Andres Kütt, Tallinn (EE)

(73) Assignee: Skype, Dublin (IE)

( * ) Notice: Subject to any disclaimer, the term of this patent is extended or adjusted under 35 U.S.C. 154(b) by 292 days.

(21) Appl. No.: 12/004,092

(22) Filed: Dec. 19, 2007

(65) Prior Publication Data

US 2009/0013048 A1    Jan. 8, 2009

(30) Foreign Application Priority Data

Jul. 3, 2007   (GB) .................................. 0712877.0

(51) Int. Cl.
 *G06F 15/16*   (2006.01)
(52) U.S. Cl. ....................................................... 709/206
(58) Field of Classification Search .......... 709/204–207, 709/217–219; 345/745
 See application file for complete search history.

(56) References Cited

U.S. PATENT DOCUMENTS

| 6,941,345 | B1 * | 9/2005 | Kapil et al. ................... 709/206 |
| 7,200,636 | B2 * | 4/2007 | Harding ........................ 709/206 |
| 7,475,112 | B2 * | 1/2009 | Sinclair et al. ................ 709/206 |
| 2002/0067812 | A1 | 6/2002 | Fellinghan et al. |
| 2002/0176404 | A1 * | 11/2002 | Girard ........................... 370/352 |
| 2003/0154446 | A1 * | 8/2003 | Constant et al. .............. 715/531 |
| 2003/0222907 | A1 * | 12/2003 | Heikes et al. ................. 345/745 |
| 2003/0225848 | A1 * | 12/2003 | Heikes et al. ................. 709/207 |
| 2004/0088357 | A1 * | 5/2004 | Harding ........................ 709/206 |
| 2005/0055627 | A1 * | 3/2005 | Lloyd et al. ................... 715/505 |
| 2005/0207379 | A1 * | 9/2005 | Shen et al. .................... 370/338 |
| 2005/0220064 | A1 * | 10/2005 | Hundscheidt et al. ........ 370/342 |
| 2006/0059236 | A1 * | 3/2006 | Sheppard et al. ............. 709/206 |
| 2006/0168015 | A1 * | 7/2006 | Fowler .......................... 709/206 |
| 2006/0294195 | A1 * | 12/2006 | Hyatt ............................. 709/217 |
| 2007/0143414 | A1 * | 6/2007 | Daigle ........................... 709/206 |
| 2008/0043942 | A1 * | 2/2008 | Cardona et al. ............ 379/88.18 |
| 2008/0086531 | A1 * | 4/2008 | Chavda et al. ................ 709/206 |
| 2008/0162649 | A1 * | 7/2008 | Lee et al. ...................... 709/206 |

(Continued)

FOREIGN PATENT DOCUMENTS

| DE | 10 2005 036424 B3 | 11/2006 |
| WO | WO 03/056732 A1 | 7/2003 |
| WO | WO 2004/049182 A1 | 6/2004 |
| WO | WO 2005/009019 A2 | 1/2005 |

OTHER PUBLICATIONS

International Search Report and Written Opinion of the International Searching Authority, date of mailing Jul. 31, 2008.

(Continued)

*Primary Examiner* — Wing Chan
*Assistant Examiner* — Alicia Baturay
(74) *Attorney, Agent, or Firm* — Wolfe-SBMC

(57) ABSTRACT

A user terminal connected to a communication network executes a communication client. The user terminal displays a list of contacts associated with a user of the client, and retrieves a message from the communication network, wherein the message is related to a further user represented by one of the contacts displayed in the list of contacts. The message includes a reference to media accessible by the communication network. The reference may be extracted from the message. A visual representation of the media may be displayed in association with one of the contacts, such that, responsive to the user actuating the visual representation, the client establishes communication with storage means using the reference and displays the media to the user.

61 Claims, 17 Drawing Sheets

U.S. PATENT DOCUMENTS

2008/0256298 A1 10/2008 Lu et al.
2008/0313056 A1 12/2008 Nowak et al.
2009/0013059 A1* 1/2009 Partaker et al. ............... 709/217
2009/0190738 A1 7/2009 Guedalia et al.
2009/0210524 A1 8/2009 McCormack et al.
2010/0098235 A1 4/2010 Cadiz et al.

OTHER PUBLICATIONS

Notification of Transmittal of the International Search Report and the Written Opinion of the International Searching Authority, or the Declaration, dated Mar. 4, 2009, from counterpart International Application No. PCT/EP2008/053721.

Office Action, U.S. Appl. No. 12/005,057, dated May 11, 2010.

Office Action, U.S. Appl. No. 12/005,057, dated Oct. 28, 2010.

Office Communication (Advisory Action), U.S. Appl. No. 12/005,057, dated Jan. 11, 2011.

Office Action, U.S. Appl. No. 12/005,057, mailing date Oct. 25, 2011.

* cited by examiner

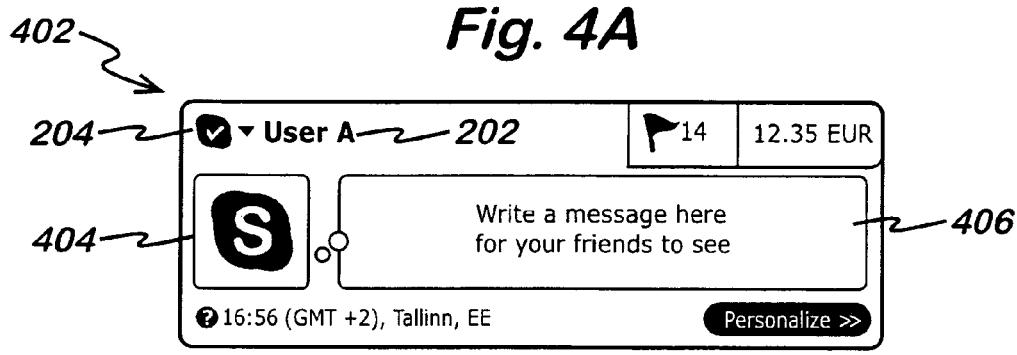
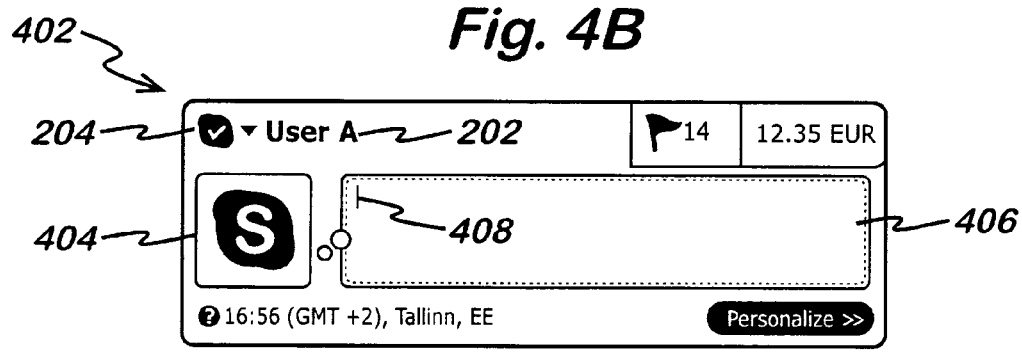
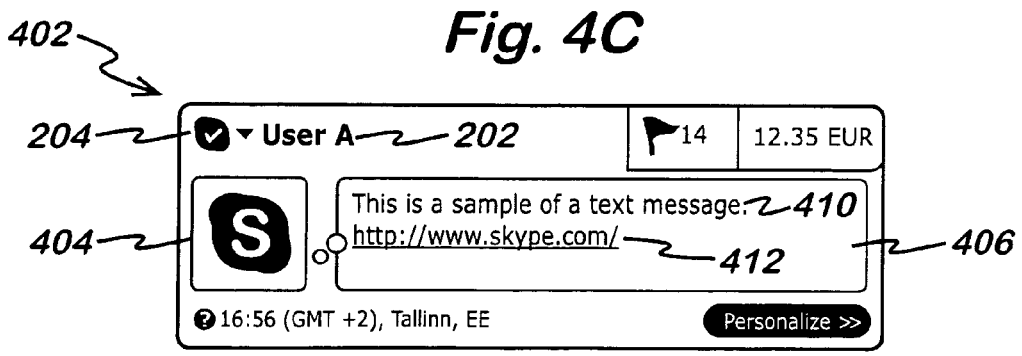

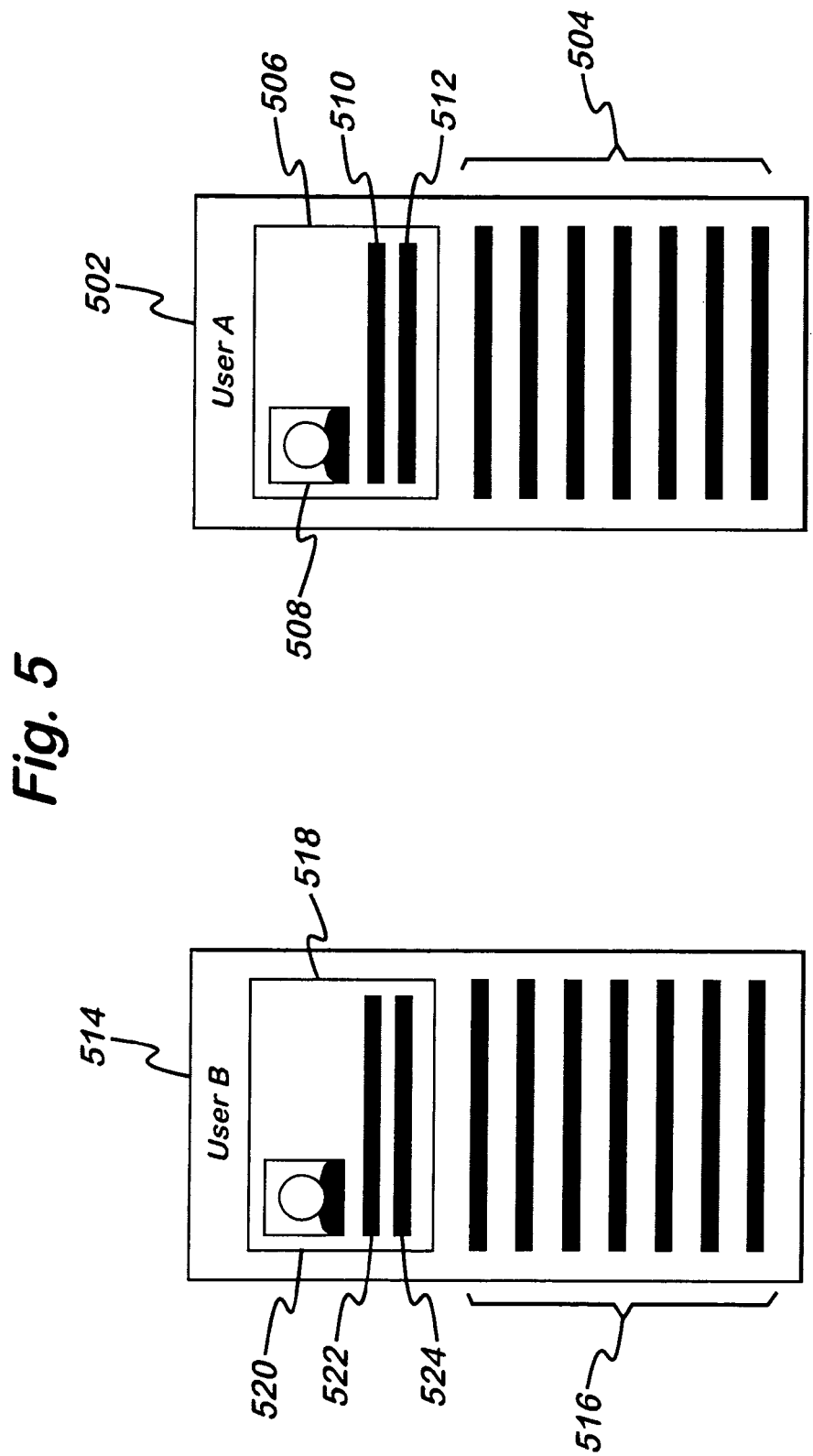

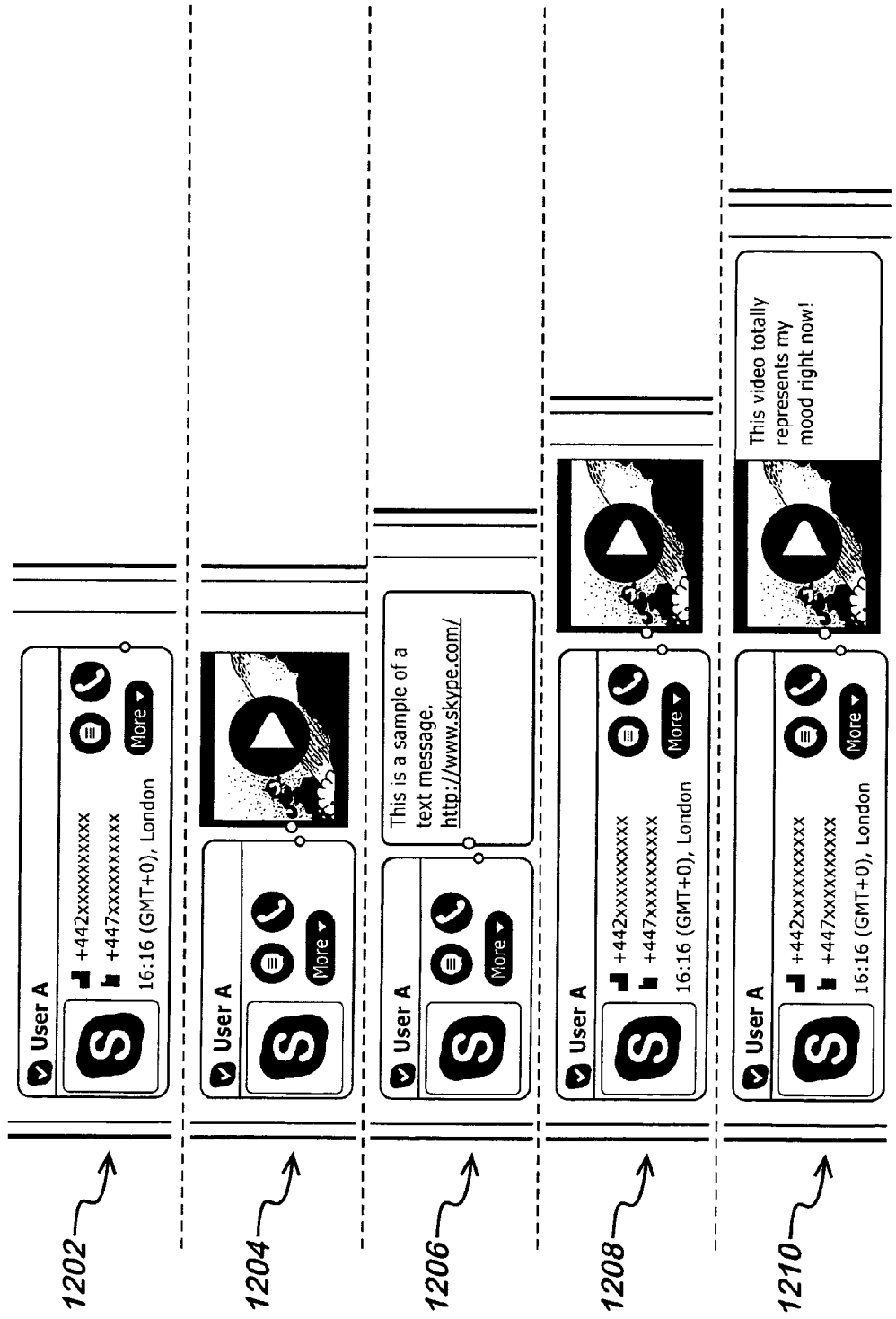

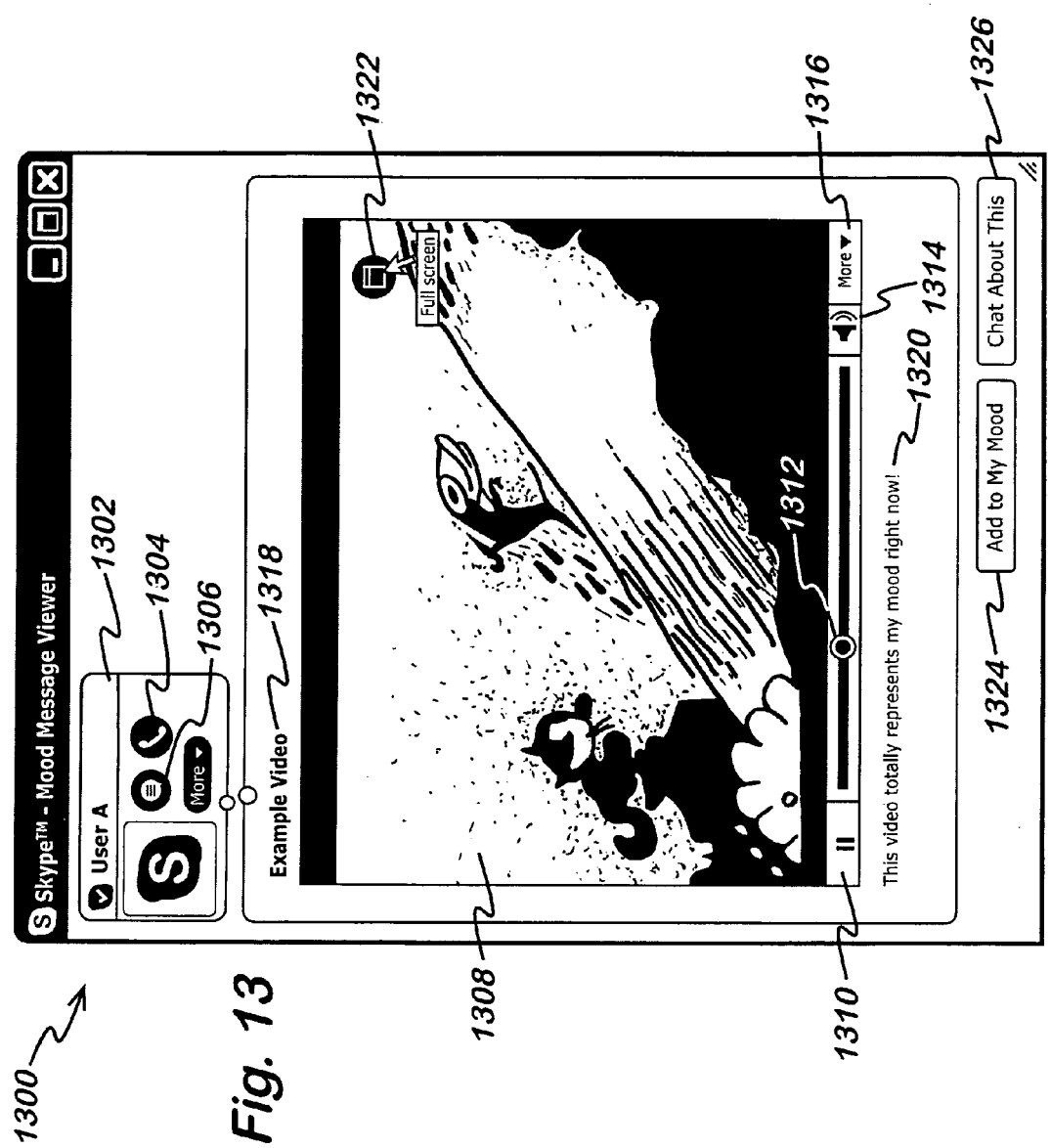

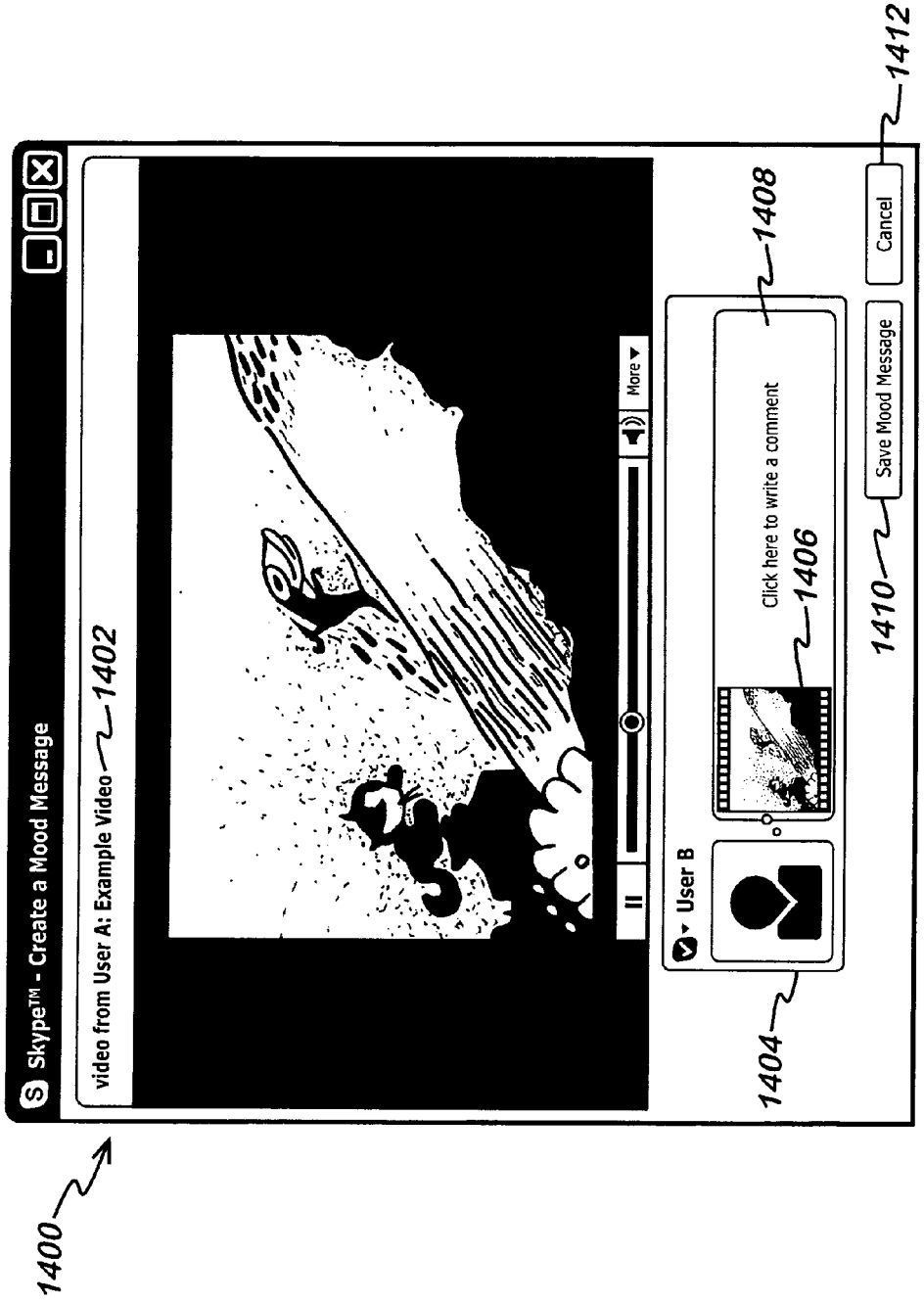

MULTIMEDIA MOOD MESSAGES

RELATED APPLICATION

This application claims priority under 35 U.S.C. §119 or 365 to Great Britain, Application No. 0712877.0, filed Jul. 3, 2007. The entire teachings of the above application are incorporated herein by reference.

TECHNICAL FIELD

This invention relates to multimedia mood messages, particularly but not exclusively for use in packet-based communication systems.

BACKGROUND

Voice over internet protocol ("VoIP") communication systems allow the user of a device, such as a personal computer, to make calls across a computer network such as the Internet. These systems are beneficial to the user as they are often of significantly lower cost than fixed line or mobile networks. This may particularly be the case for long distance calls. To use VoIP, the user must install and execute client software on their device. The client software provides the VoIP connections as well as other functions such as registration and authentication. In addition to voice communication, the client may also provide video calling and instant messaging ("IM").

One type of VoIP communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the user's identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

One of the advantages of VoIP communication systems, compared to the public switched telephone network ("PSTN"), is that presence information can be provided for the users. Presence information is an indication of the current status of a user of the system. More specifically, presence information is displayed in the user interface of the client for each of the contacts that the user has stored, and allows the user to view the current status of the contacts in the system. Example presence states that may be displayed include "online", "offline", "away", "not available" and "do not disturb".

The use of presence states provides a user with a best guess regarding the current state of a contact before attempting to communicate with the contact. For example, if the user is not online, and therefore unable to be contacted, then this is indicated to the user before attempting to make a call. Similarly, if a contact is busy and unlikely to answer, then this may also be communicated in advance via the presence state. This is a considerable advantage over PSTN systems, which do not provide any prior information on the probable state of a user. The only option in PSTN systems is to dial a number and wait and see if it is answered.

Presence information in VoIP communication systems can be supplemented by "mood messages". Mood messages are short text strings that are composed by the users to distribute information about themselves to their contacts and supplement their presence status. The mood message of a contact is generally displayed next to the contact's name and presence status in the client. Mood messages are useful for a number of reasons. For example, a mood message can be used to give more information or a reason for a particular presence status, e.g. if a user is offline, the mood message may say "On holiday", thereby explaining why the user is offline. Similarly, if a user's presence state is set to "do not disturb", the mood message may say "Busy working. Only contact me if urgent". Mood messages are also useful for users that travel frequently, as a VoIP system can be accessed from anywhere in the world, but this is not reflected in the presence states. Therefore, it is useful for a user to show a mood message such as "In London" next to their presence state.

One popular use for mood messages is to incorporate interesting, humorous or entertaining phrases, quotes or slogans. It has been found that users of the VoIP system have readily adopted and enjoy this use of the mood message functionality, as it provides a degree of self-expression and personalisation. Furthermore, users are increasingly using the mood message as a means to easily share some interesting information with all their contacts. For example, users can include a hyperlink to a particular webpage in the mood message, so that all the user's contacts will see the hyperlink and will be prompted to visit the webpage. Similarly, the mood message can be automatically populated by a music player program, so that the mood message displays the title and artist of the music that the user is currently listening to. The use of the mood message as a means of self expression and as a channel to share information can often stimulate conversation over the VoIP system.

SUMMARY

A problem with mood messages is that the level of self-expression that can be conveyed using the messages is limited. This is due to the short length and text-based nature of the messages. Known mood messages need to be short and text-based due to the network overhead that is required to transmit the mood message data to a potentially very large number of users of the VoIP system, and also because of space constraints in the user interface of the client for the display of the mood message.

There is therefore a need for a technique to address the aforementioned problems with mood messages and provide for the efficient transmission and display of more expressive mood messages.

According to one aspect of the present invention there is provided a user terminal connected to a communication network and executing a communication client, comprising: display means for displaying a list of contacts associated with a user of said client; means for retrieving a message from said communication network, wherein said message is related to a further user represented by one of said contacts displayed in said list of contacts, said message comprising a reference to media stored in a storage means accessible by said communication network; means for extracting said reference from said message; and means for displaying a visual representation of said media in association with said one of said contacts, such that, responsive to the user actuating said visual representation, the client establishes communication with said storage means using said reference and displays the media to said user.

In one embodiment, said media is a video. In another embodiment, said media is an image. In another embodiment, said media is an audio recording.

In one embodiment, said visual representation is a thumbnail image. Preferably, said message comprises said thumbnail image. In another embodiment, said visual representation is a resized video.

Preferably, the user terminal further comprises means for downloading the list of contacts from a network element. Preferably, the message is retrieved from a client executed at a user terminal of the further user. Preferably, said message is a mood message created by said further user. In one embodiment, said mood message is created by said further user selecting said media from a page displaying a list of available media. Preferably, said list of available media is provided by at least one content provider over said communication network. In another embodiment, said mood message is created by said further user entering an address of a webpage into the client executed at the user terminal of the further user. In another embodiment, said mood message is created by said further user actuating a button displayed on a webpage.

Preferably, said message further comprises user-readable text data. Preferably, said user-readable text data is entered by said further user.

Preferably, the user terminal further comprises media player means, wherein said media is displayed to said user using said media player means. Preferably, said media player means is executed under control of said client, and a user interface of said media player means is displayed to said user in a pop-up window. Preferably, said media player means displays a first control, such that actuation of said first control by said user causes the reference to said media to be added to a mood message for said user. Preferably, said media player means displays a second control, such that actuation of said second control by said user causes an instant messaging session to be established between the user and at least one other user over said communication network. Preferably, said media player is executed under the control of said client, and said media player means displays said media at the location of said visual representation.

Preferably, the user terminal further comprises means for ascertaining whether said reference to said media is listed in a database prior to displaying said media. Preferably, if said reference to said media is listed in said database, said user terminal does not display said media. Preferably, said reference is a network address of said media. Preferably, said network address is a uniform resource identifier.

Preferably, said communication network is a packet based communication network.

In one embodiment, said communication client is a voice over internet protocol communication client. Preferably, said voice over internet protocol communication client is a peer-to-peer communication client. In another embodiment, said communication client is an instant messaging communication client.

In one embodiment, said user terminal is a personal computer. In another embodiment, said user terminal is a mobile device.

According to another aspect of the present invention there is provided a method of distributing a message from a first user terminal to at least one other user terminal connected via a communication network, comprising: generating the message at a first communication client executed on said first user terminal, said message comprising a reference to media stored in a storage means accessible by said communication network; said at least one further user terminal executing a second communication client; said second client retrieving said message from said first communication client over said communication network and extracting said reference from said message; said second client displaying a visual representation of said media in association with an identity of a user of the first user terminal; and responsive to a user of said at least one further user terminal actuating said visual representation, said second client establishing communication with said storage means using said reference and displaying the media.

According to another aspect of the present invention there is provided a system for distributing a message from a first user terminal to at least one other user terminal connected via a communication network, comprising: a first communication client executed on said first user terminal and comprising means for generating the message, said message comprising a reference to media stored in a storage means accessible by said communication network, and means for transmitting said message over said communication network; and a second communication client executed on said at least one further user terminal, said second client comprising means for retrieving said message from said first communication client over said communication network, means for extracting said reference from said message, and means for displaying a visual representation of said media in association with an identity of a user of the first user terminal, such that, responsive to a user of said at least one further user terminal actuating said visual representation, the client establishes communication with said storage means using said reference and displays the media to said user.

According to another aspect of the present invention there is provided a method of displaying a message at a user terminal connected to a communication network and executing a communication client, comprising: displaying a list of contacts associated with a user of said client; said client retrieving a message from said communication network, wherein said message is related to a further user represented by one of said contacts displayed in said list of contacts, said message comprising a reference to media stored in a storage means accessible by said communication network; extracting said reference from said message; and displaying a visual representation of said media in association with said one of said contacts, such that, responsive to the user actuating said visual representation, the client establishes communication with said storage means using said reference and displays the media to said user.

According to another aspect of the present invention there is provided a computer program product comprising program code means which when executed by a computer implement the steps according to the above defined method of displaying a message.

BRIEF DESCRIPTION OF THE DRAWINGS

For a better understanding of the present invention and to show how the same may be put into effect, reference will now be made, by way of example, to the following drawings in which:

FIG. 4A to 4C shows a known user interface for entering a mood message into a client;

FIG. 5 shows a diagrammatic representation of data stored in a contact server;

FIG. 12 shows contact information from a portion of a client user interface with different widths;

FIG. 13 shows a video playback window; and

FIG. 14 shows a mood message creation window.

DETAILED DESCRIPTION

Figure 1:
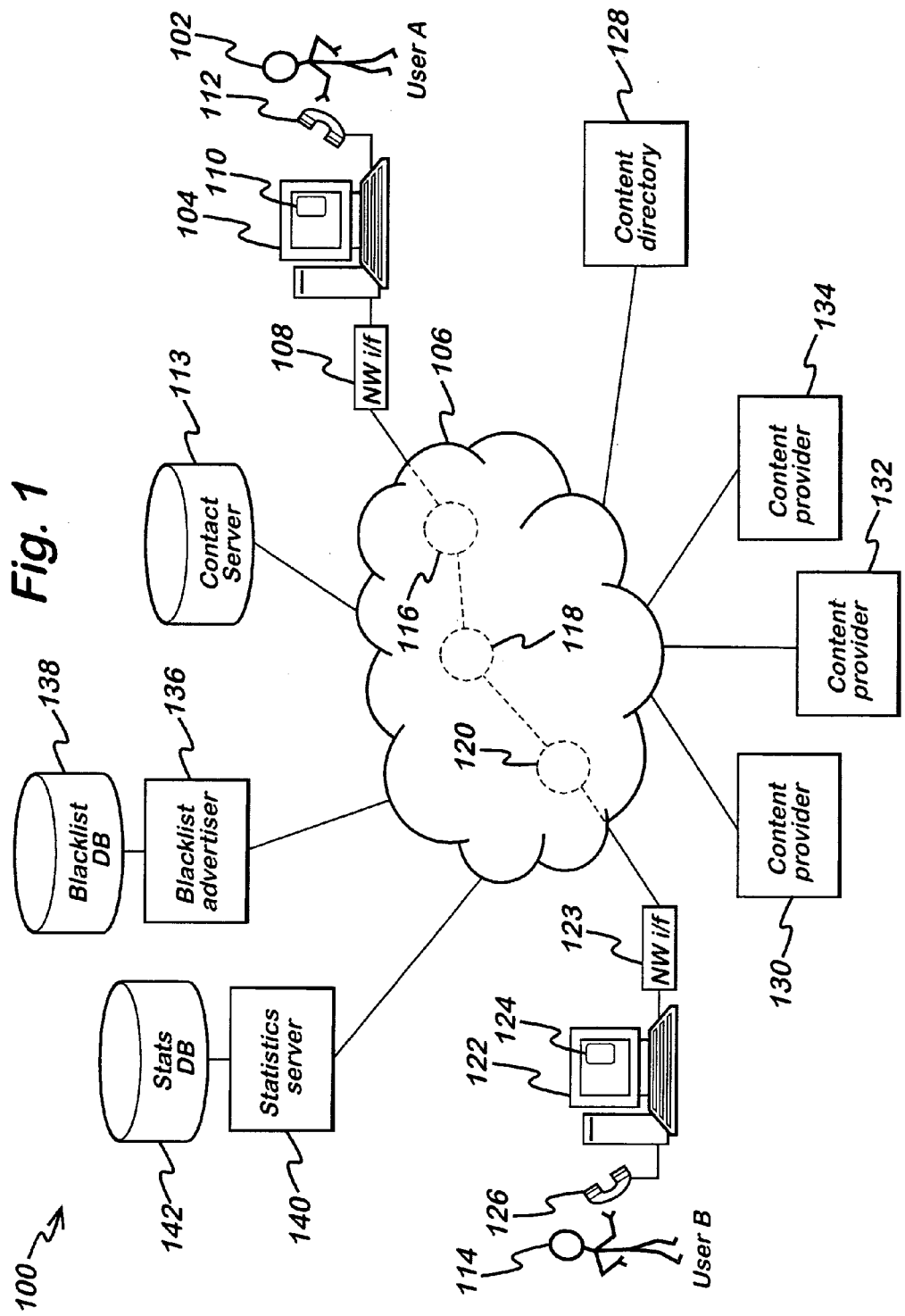
FIG. 1 shows a P2P communication system.

Reference is first made to FIG. 1, which illustrates a P2P communication system 100. Note that whilst this illustrative embodiment is described with reference to a P2P communication system, other types of communication system could also be used, such as instant messaging systems and other, non-P2P, VoIP systems. A first user of the P2P communication system (denoted "User A" 102) operates a user terminal 104, which is shown connected to a network 106, such as the Internet. The user terminal 104 may be, for example, a personal computer ("PC"), personal digital assistant ("PDA"), a mobile phone, a gaming device or other embedded device able to connect to the network 106. The user device is arranged to receive information from and output information to a user of the device. In a preferred embodiment of the invention the user device comprises a display such as a screen and a keyboard and mouse. The user device 104 is connected to the network 106 via a network interface 108 such as a modem, and the connection between the user terminal 104 and the network interface 108 may be via a cable (wired) connection or a wireless connection.

The user terminal 104 is running a client 110, provided by the P2P software provider. The client 110 is a software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, or as a separate loudspeaker and microphone independently connected to the user terminal 104.

Figure 2:
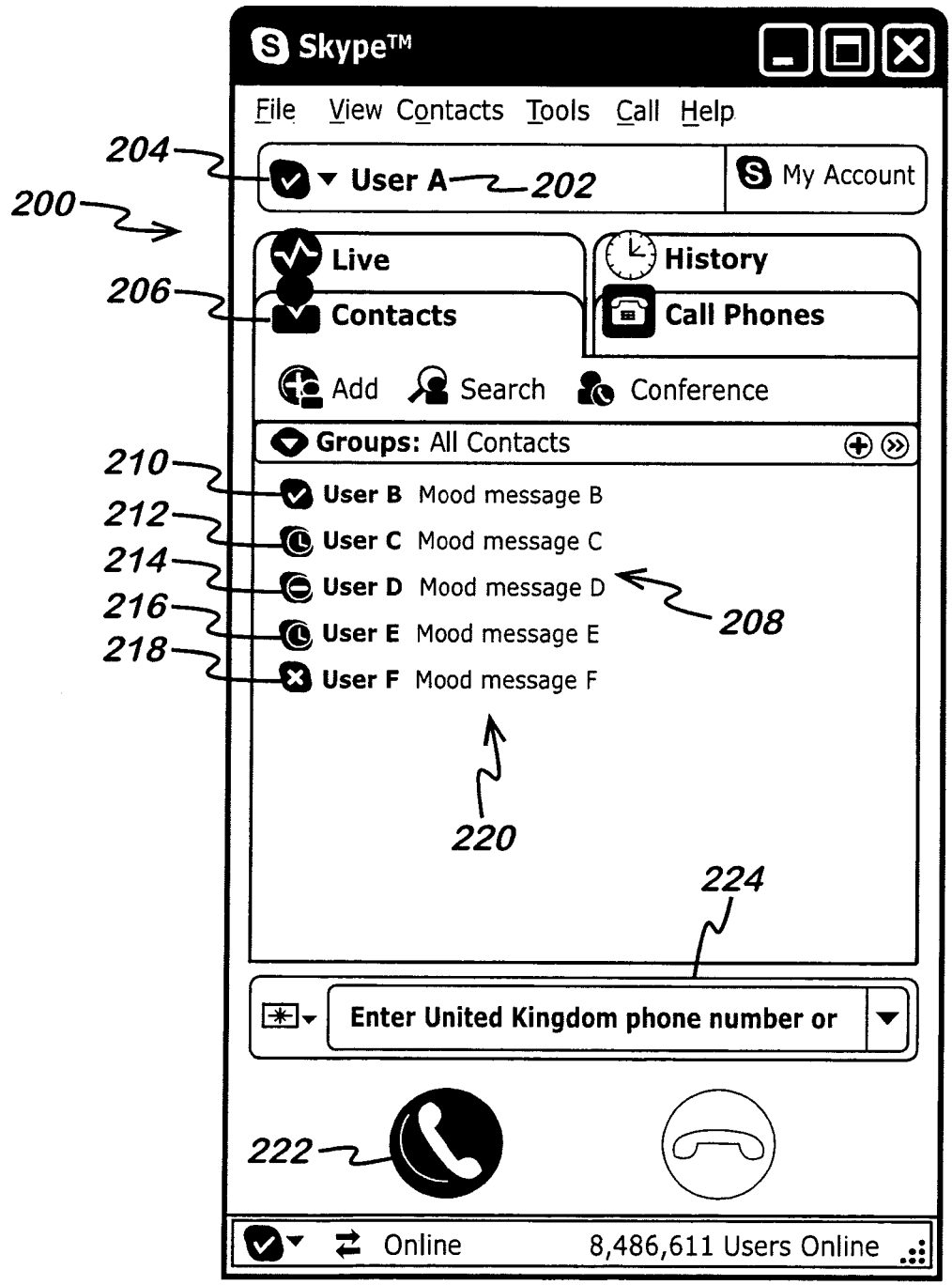
FIG. 2 shows a user interface of a client executed on a user terminal.

An example of a user interface 200 of the client 110 executed on the user terminal 104 of User A 102 is shown illustrated in FIG. 2. The client user interface 200 displays the username 202 of User A 102 in the P2P system, and User A can set his own presence state (that will be seen by other users) using a drop down list by selecting icon 204.

The client user interface 200 comprises a tab 206 labelled "contacts", and when this tab is selected the contacts stored by the user in a contact list are displayed. In the example user interface in FIG. 2, five contacts of other users of the P2P system (User B to F) are shown listed in contact list 208. Each of these contacts have authorised the user of the client 110 to view their contact details and online presence and mood message information. Each contact in the contact list has a presence status icon associated with it. For example, the presence status icon for User B 210 indicates that User B is "online", the presence icon for User C 212 indicates that User C is "not available", the presence icon for User D 214 indicates that User D's state is "do not disturb", the presence icon for User E 216 indicates User E is "away", and the presence icon for User F 218 indicates that User F is "offline". Further presence indications can also be included. Next to the names of the contacts in pane 208 are the mood messages 220 of the contacts.

The contact list for the users (e.g. the contact list 208 for User A) is stored in a contact server 113 shown in FIG. 1. When the client 110 first logs into the P2P system the contact server 113 is contacted, and the contact list is downloaded to the user terminal 104. This allows the user to log into the P2P system from any terminal and still access the same contact list. The contact server is also used to store the user's own mood message (e.g. the mood message of User A 102) and a picture selected to represent the user (known as an avatar). This information can be downloaded to the client 110, and allows this information to consistent for the user when logging on from different terminals. The client 110 also periodically communicates with the contact server 113 in order to obtain any changes to the information on the contacts in the contact list, or to update the stored contact list with any new contacts that have been added. Presence information is not stored centrally in the contact server. Rather, the client 110 periodically requests the presence information for each of the contacts in the contact list 208 directly over the P2P system. Similarly, the current mood message for each of the contacts, as well as a picture (avatar) that has been chosen to represent the contact, are also retrieved by the client 110 directly from the respective clients of each of the contacts over the P2P system.

Calls to the P2P users in the contact list may be initiated over the P2P system by selecting the contact and clicking on a "call" button 222 using a pointing device such as a mouse. Alternatively, the call may be initiated by typing in the P2P identity of a contact in the field 224. Referring again to FIG. 1, the call set-up is performed using proprietary protocols, and the route over the Internet 106 between the calling user and called user is determined by the peer-to-peer system without the use of servers. In FIG. 1, an illustrative route is shown between the caller User A (102) and the called party, User B (114), via other peers (116, 118, 120) of the P2P system. It will be understood that this route is merely an example, and that the call may be routed via fewer or more peers.

Following authentication through the presentation of digital certificates (to prove that the users are genuine subscribers of the P2P system—described in more detail in WO 2005/009019), the call can be made using VoIP. The client 110 performs the encoding and decoding of VoIP packets. VoIP packets from the user terminal 104 are transmitted into the Internet 106 via the network interface 108, and routed to the computer terminal 122 of User B 114, via a network interface 123. A client 124 (similar to the client 110) running on the user terminal 122 of User B 114 decodes the VoIP packets to produce an audio signal that can be heard by User B using the handset 126. Conversely, when User B 114 talks into handset 126, the client 124 executed on user terminal 122 encodes the audio signals into VoIP packets and transmits them across the Internet 106 to the user terminal 104. The client 110 executed on user terminal 104 decodes the VoIP packets from User B 114, and produces an audio signal that can be heard by the user of the handset 112.

The VoIP packets for the P2P call described above are passed across the Internet 106 only, and the PSTN network is not involved. Furthermore, due to the P2P nature of the system, the actual voice calls between users of the P2P system can be made with no central servers being used. This has the advantages that the network scales easily and maintains a high voice quality, and the call can be made free to the users.

Figure 3:
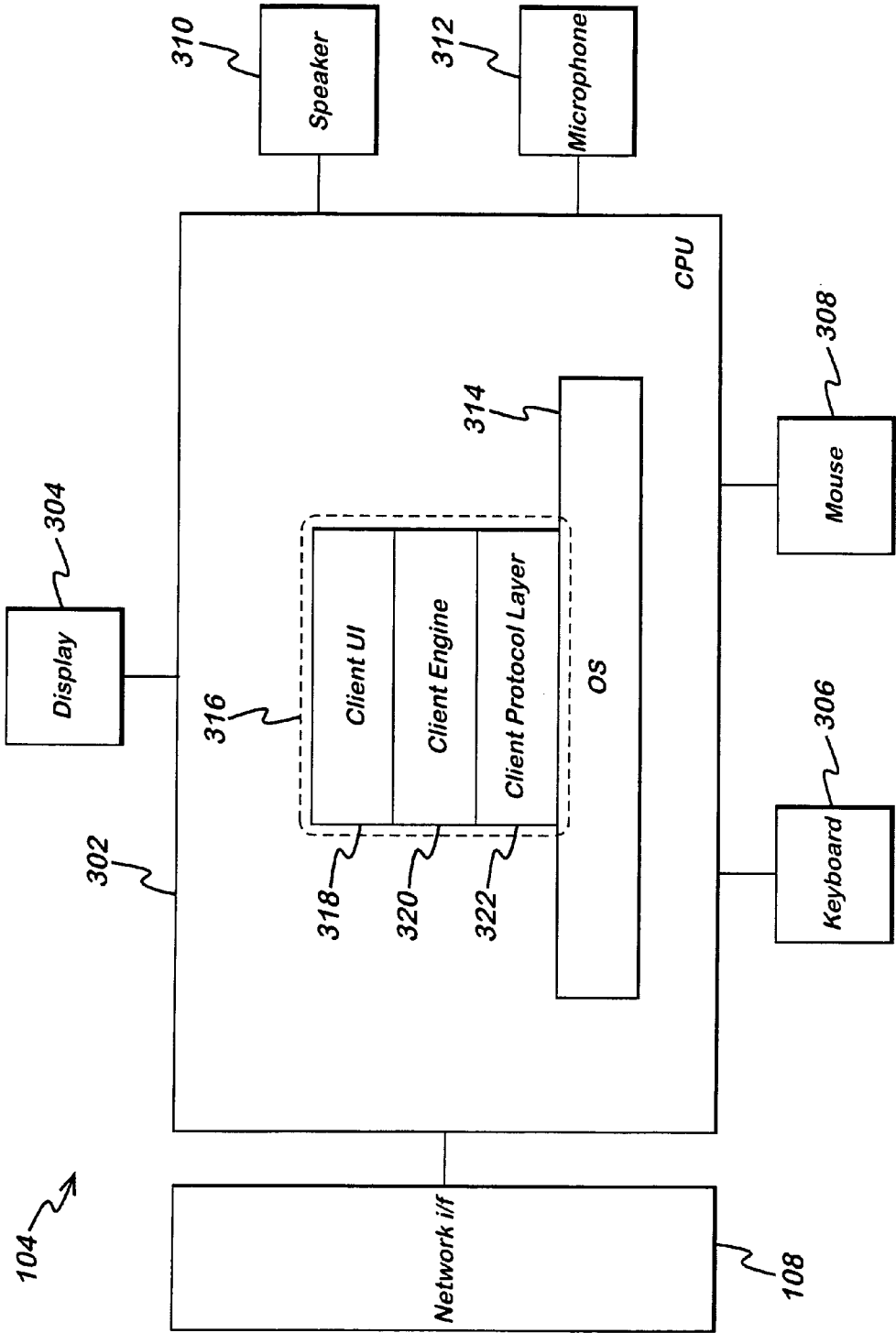
FIG. 3 shows a detailed view of a user terminal on which is executed a client.

FIG. 3 illustrates a detailed view of the user terminal (104) on which is executed client 110. The user terminal 10 comprises a central processing unit ("CPU") 302, to which is connected a display 304 such as a screen, an input device such as a keyboard 306, a pointing device such as a mouse 308, a speaker 310 and a microphone 312. The speaker 310 and microphone 312 may be integrated into a handset 112 or headset, or may be separate. The CPU 302 is connected to a network interface 108 as shown in FIG. 1.

FIG. 3 also illustrates an operating system ("OS") 314 executed on the CPU 302. Running on top of the OS 314 is a software stack 316 for the client 110. The software stack shows a protocol layer 322, a client engine layer 320 and a client user interface layer ("UI") 318. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 322 of the client software communicates with the operating system 314 and manages the connections over the P2P system. Processes requiring higher level processing are passed to the client engine layer 320, which handles the processing required for the user to make and receive calls over the P2P system. The client engine 320 also communicates with the client user interface layer 318. The client engine 320 may be arranged to control the client user interface layer 318 to present information to the user via the user interface of the client (as shown in FIG. 2) and to receive information from the user via the user interface. The control of the client user interface 318 will be explained in more detail hereinafter.

Reference is now made to FIGS. 4A to 4C, which illustrate the known user interface for entering a mood message into a client. FIG. 4A shows a portion of the client user interface for User A 102 (as shown in FIG. 1) that is used by User A to set his mood message. The panel 402 is shown when User A uses the pointing device 308 of the user terminal 104 to select the field displaying his username (labelled 202 in FIG. 2) in the client user interface (200 in FIG. 2). Panel 402 displays the username 202 and presence icon 204 for User A (as in FIG. 2). In addition, panel 402 also displays an avatar 404 that User A has selected to represent himself, and a text-entry box 406 in which User A can enter a mood message.

When User A uses the pointing device 308 of the user terminal 104 to select the text-entry box 406, the panel shown in FIG. 4B is displayed. The text-entry box 406 is displayed in a different colour, and a cursor 408 is present in the text-entry box 406 to indicate to the user that text may be typed.

After User A has typed a mood message into text-entry box 406, then the panel 402 is of the form shown in FIG. 4C. In this example, User A has typed the text message "This is a sample text message" 410 and has also typed a webpage address "http://www.skype.com" 412, which is automatically hyperlinked by the client 112 such that the address 412 becomes a clickable link in the UI, whereby if the user clicks the link using the pointing device 308, the user terminal 104 executes a web-browser program that navigates to the webpage address and displays the webpage to the user on the display device 304.

The mood message that was typed by User A is transmitted to the contact server 113 and stored in User A's data record. In alternative embodiments, the mood message data is not transmitted immediately to the contact server 113, but is sent with the next periodic update message from the client 110 to the contact server 113. In addition, the mood message of User A 102 is also periodically communicated to each of User A's contacts over the P2P system when this is retrieved by the contacts.

FIG. 5 shows a diagrammatic representation of the data stored in the contact server 113 for the users. Data record 502 illustrates the data stored in the contact server for User A. The data record 502 comprises a contact list 504, which mirrors the contact list 208 shown in the client user interface 200. The data record 502 also comprises profile data 506 for User A, which includes the avatar 508, User A's mood message 510 and other profile data 512 for the user (e.g. language, birthday, etc.) FIG. 5 also shows the data record 514 for User B (114 in FIG. 1). This data record 514 also comprises a contact list 516 and profile data 518 (including avatar 520, mood message 522 for User B, and other profile data 524).

Figure 6:
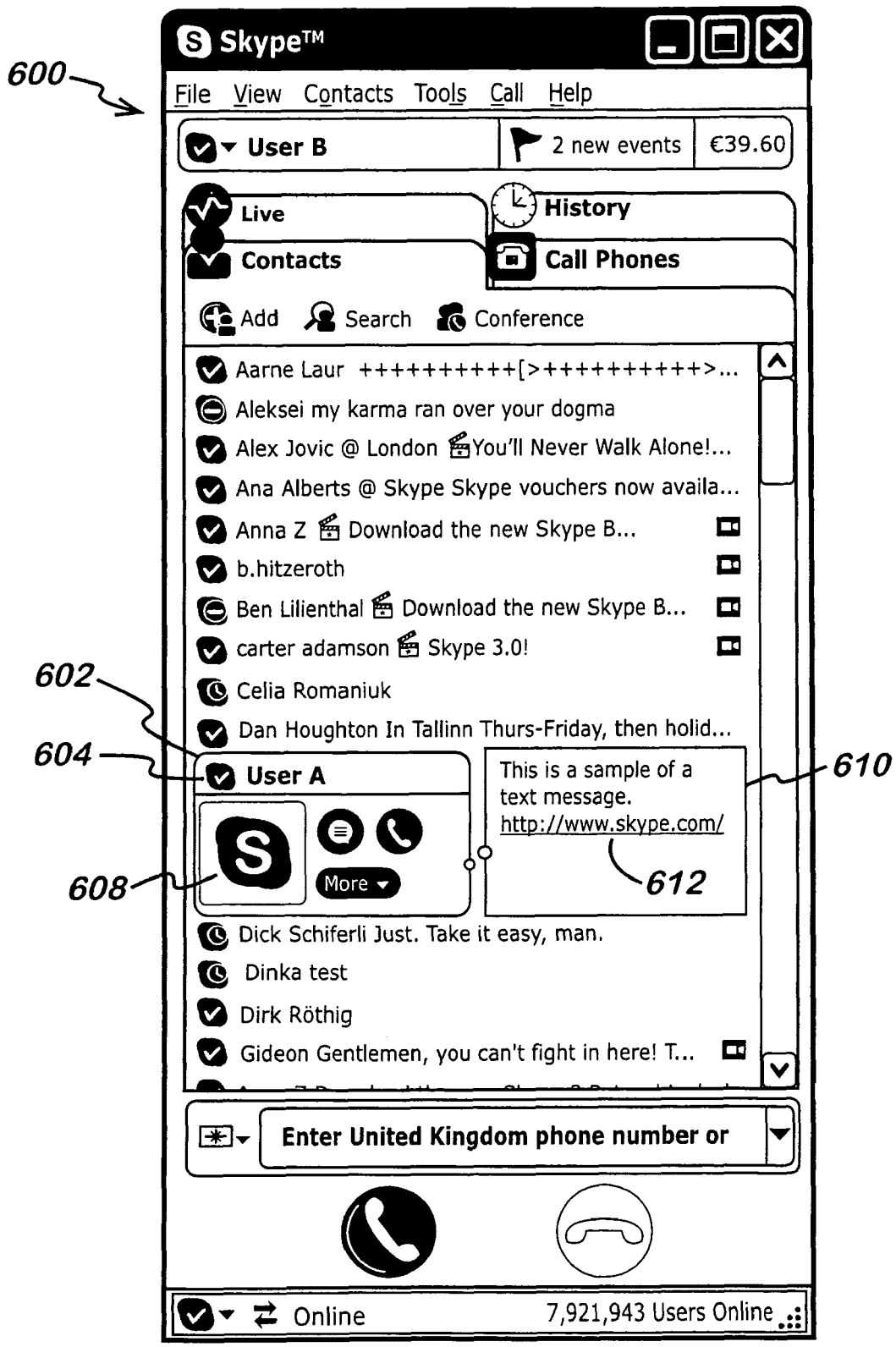
FIG. 6 shows a user interface for a client of User B following the update of a mood message for User A.

FIG. 6 illustrates the user interface 600 for the client 124 of User B, following the update of the mood message for User A (i.e. after User B's client 124 has retrieved the new mood message of User A 102 over the P2P system). The main features of UI 600 are the same as those shown in FIG. 2 and described previously. In FIG. 6, the contact listed for User A has been selected using a pointing device, in order to expand the contact information and show the "contact card" 602 for User A. The contact card 602 displays the presence icon 604, name 606, avatar 608 and mood message 610 for User A. The mood message 610 shows the text and web address entered by User A in FIG. 4C. The client 124 has detected the presence of a web address in the mood message and automatically created a clickable hyperlink 612. Therefore, the mood message of User A can be viewed by User B (who is an authorised contact of User A), thereby providing text-based information on User A's status, mood, or interests and supplementing the presence information.

Figure 7A:
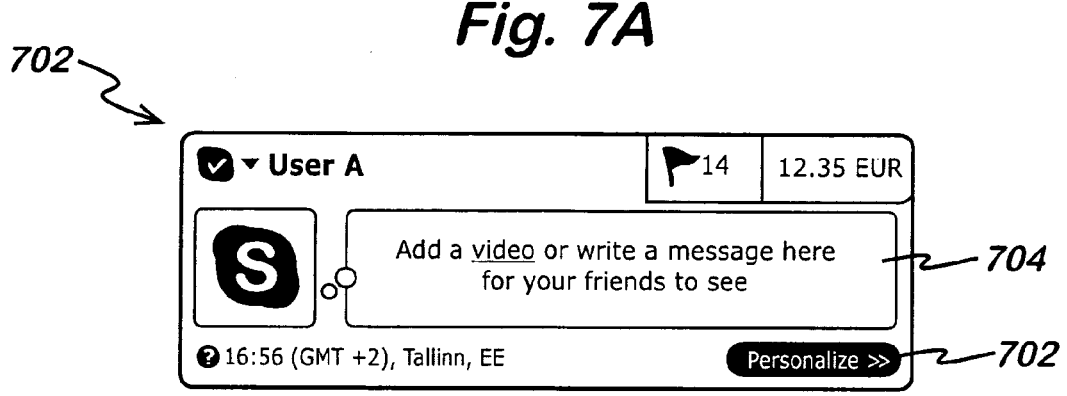
FIGS. 7A and 7B show a user interface for adding a multimedia mood message.
Figure 7B:
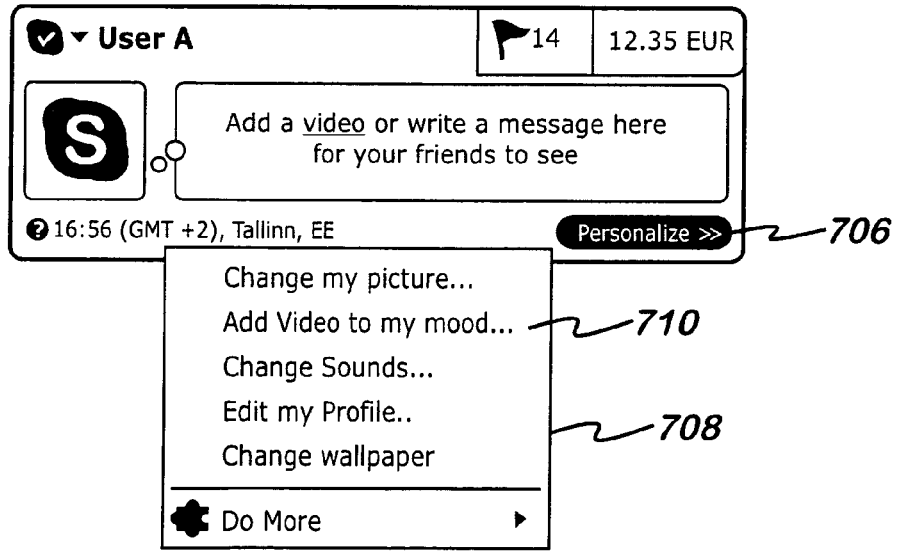

Reference is now made to FIGS. 7A and 7B, which illustrates the UI for adding a multimedia mood message according to an embodiment of the present invention. In the following embodiment, a video is incorporated into a user's mood message. However, it will be appreciated that the same technique may be used for incorporating other types of media into mood messages, such as images and sound recordings.

FIG. 7A shows a portion of the client UI for User A 102 similar to that shown in FIG. 4A. Panel 702 comprises a mood message entry area 704 which displays a different message to that in FIG. 4A. In particular, the message invites the user to enter a text message or to add a video into their mood message, and has a hyperlink embedded for the word "video". The user therefore not only has the option to write a text message, but also to add a video to their mood message. Note that in alternative embodiments, other types of media (such as still images or audio) may also be added to mood messages. In this instance, the hyperlink in FIG. 7A is changed accordingly, for example to read "video or photo".

If the user uses the pointing device to click in the mood message entry area 70 (but not on the word "video") then a cursor is shown as in FIG. 4B, and the user can type a text message, as in FIG. 4C, which is then distributed to the authorised contacts of User A as described previously.

If the user uses the pointing device to click on the word "video", then the user begins the process for selecting a video, as will be described presently. FIG. 7B illustrates an alternative method for selecting to add a video, instead of clicking on the hyperlinked word in FIG. 7A. If the user selects the "Personalise" button 706, then a pop-up menu 708 is displayed. One of the options in the pop-up menu 708 is "Add Video to my Mood" 710. Selecting option 710 from the pop-up menu 708 causes the video selection process to be initiated.

Figure 8:
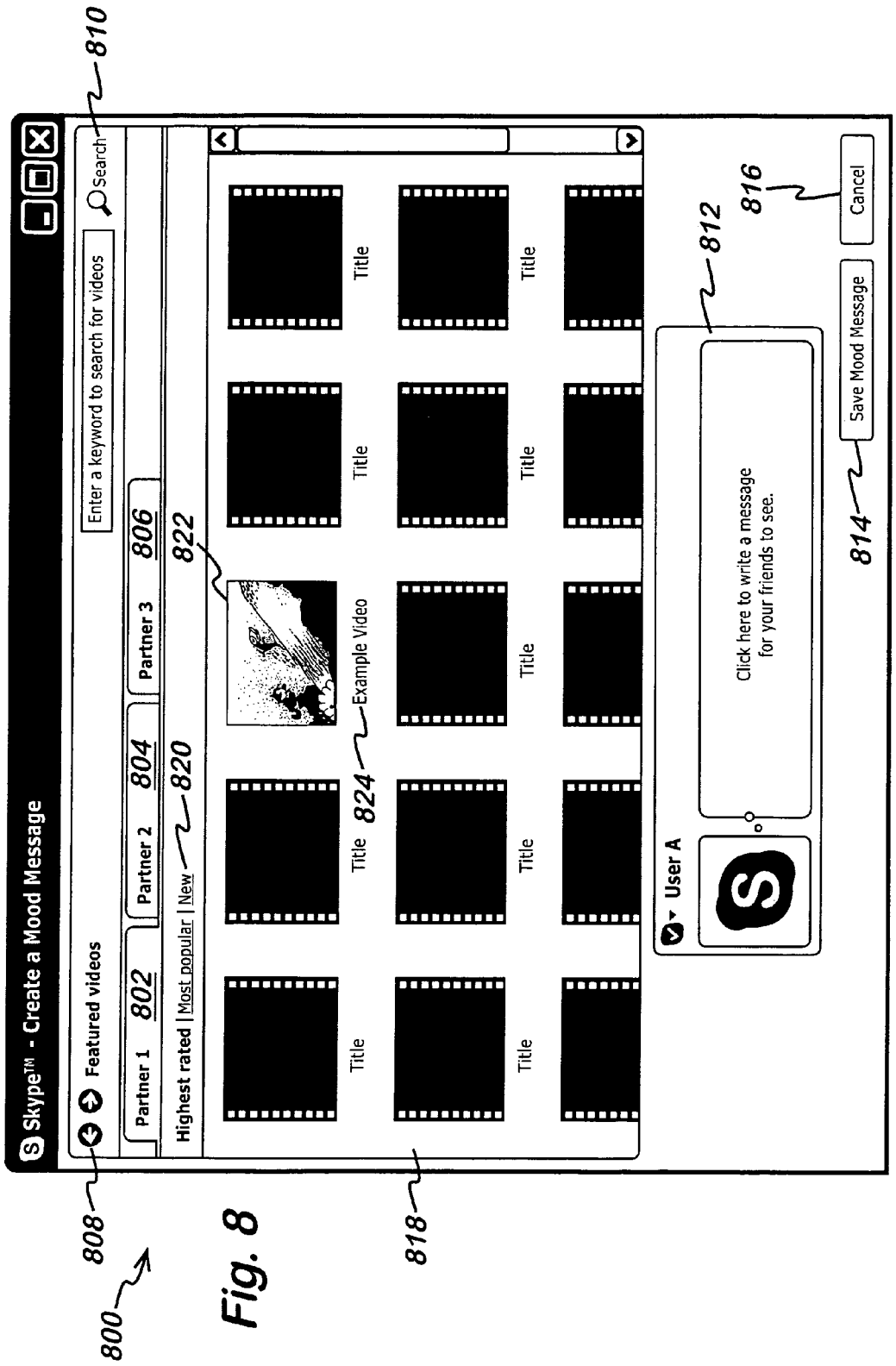
FIG. 8 shows a user interface for selecting a video to add to a mood message.

When the user selects to add a video to their mood message, the user is presented with the UI 800 illustrated in FIG. 8. The UI 800 can be considered to comprise two separate elements. The first element is the frame of the UI 800, comprising tabs (802, 804, 806), navigation buttons 808, search field 810, mood message preview area 812 and control buttons (814, 816). The second element is a pane 818 which shows different information for each of the tabs (802, 804, 806). Specifically, pane 818 displays representations of the available videos.

The information for the above-two elements in UI 800 is fetched from different sources. Firstly, the information relating to the frame of the UI is fetched from a content directory 128. The content directory 128 is shown in FIG. 1 connected to the network 106. The client 110 is arranged to communicate with the content directory 128 and retrieve the information to allow the client 110 to present the UI 800 to the user. In particular, the client 110 needs to fetch the information regarding the tabs (802, 804, 806). Specifically, information is needed on the number of tabs (three are shown in FIG. 8, but more or less tabs may be shown—for example if there is only a single content provider then no distinct tabs are required), the titles of the tabs, and the address of where the information to populate pane 818 for each tab is located. Preferably, this address is in the form of a webpage uniform resource locator ("URL").

Once the information regarding the frame of UI 800 has been retrieved from the content directory 128, the information for pane 818 is retrieved from a content provider. FIG. 1 illustrates three separate content providers (130, 132, 134) connected to network 106. In this exemplary embodiment, these three content providers (130, 132, 134) respectively provide the information displayed for the three tabs (802, 804, 806) of UI 800. The content providers (130, 132, 134) provide the information that populates pane 818 and also provide the actual video data. Preferably, the content providers are third parties, and separate from the P2P software provider. Note that the media content that is made available by the content provider can be provided by individual users uploading the media to the content provider.

In the example shown in FIG. 8 the UI 800 shows the content for tab 802, labelled "Partner 1". The client uses the address obtained from the content directory 128 for tab 802 to access content provider 130 in order to display the information for this tab. More specifically, the address from the content directory 128 is a URL of a webpage provided by the content provider 130, and the client downloads this webpage (in the form of hypertext mark-up language ("HTML")) over the network 106 and displays the webpage in pane 818. If the user uses the pointing device to select a different tab, such as 804 or 806, then the address provided by the content directory for the selected tab is used to fetch the information to be displayed for this tab.

The purpose of the information shown in pane 818 is to provide the user with a selection of videos that are available to be included in the user's mood message. Pane 818 displays a plurality of thumbnail images (e.g. thumbnail 822) representing each video and a title (e.g. title 824) for each video. The thumbnail image for a video is a small image of a single frame from the video. The thumbnail for each video is generated from the video file itself (e.g. it can be the first frame of the video, or a frame a predetermined time or percentage into the video). Preferably, a list of categories 820 is displayed to allow the user to view a sub-set of the available videos. Furthermore, the user can search the videos by keywords using the search field 810.

Preferably, the content directory 128 is provided by the P2P software provider. This allows the P2P software provider to present a portal to several content providers (130, 132, 134) that are able to provide videos to the users, thereby avoiding the requirement for the P2P software provider to host and/or stream its own videos. The content directory 128 can be updated to add or remove content providers as required.

When UI 800 is displayed on the user's terminal 104, the user can use the pointing device to browse the available videos from the different content providers (by using the different tabs 802-806, the categories 820 and the search field 810). When a user sees a video that he is interested in, he clicks the thumbnail to view a preview of the video. This is illustrated in FIG. 9.

Figure 9:
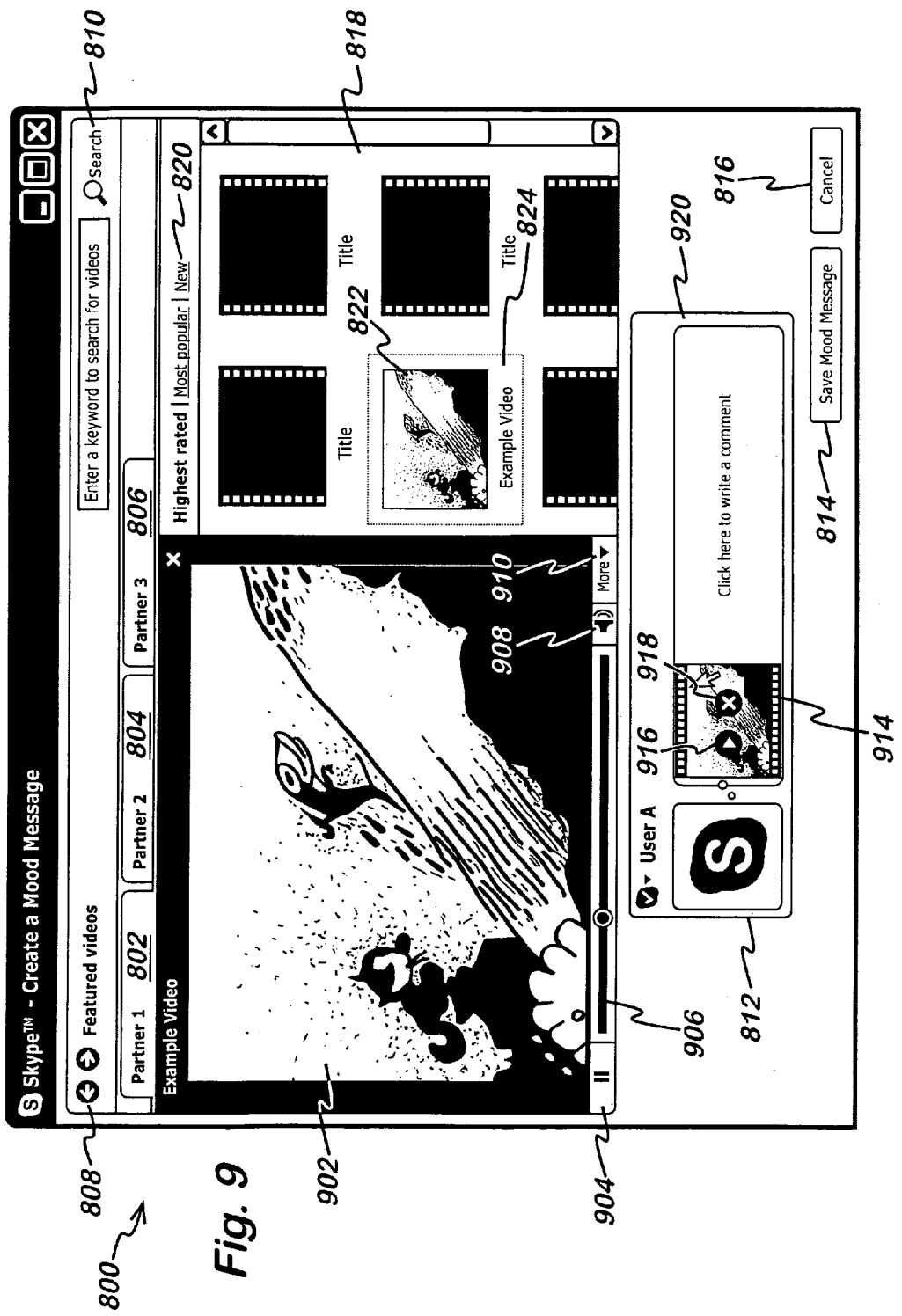
FIG. 9 shows a video preview user interface.

FIG. 9 illustrates UI 800 when a video has been selected by the user. It will be noted that the frame portion of UI 800 is the same as that shown in FIG. 8. However, the pane 818 has changed in order to display a preview of a video. In this example, the user has selected the video entitled "Example Video" 824 by clicking on the thumbnail image 822. This has resulted in the pane 818 being reduced in width, such that the thumbnails and category controls are now on the right hand side of the UI. To the left hand side of the UI, an embedded video player is executed by the client 110 in order to preview the selected video. The embedded video player comprises a main display 902 in which the video is played (larger than the thumbnail), a play/pause button 904 to allow the user to control playback, a progress bar 906 graphically indicating the time position in the video, a sound control button 908 and a menu button 910.

Once the embedded video player has played the video to the user, the user can chose to watch the video again (by pressing the play/pause button 904) or to close the preview using close button 912 and return to the UI shown in FIG. 8. In addition, at the end of the video, the user may be displayed an advertisement. The advertisement may promote further videos, which can be selected by the user and played within the embedded video player.

When a video is selected to be previewed, a thumbnail image 914 of the video is shown in the mood message preview area 812. This allows the user to see what the video will look like when added to his mood message. In preferred embodiments, the thumbnail image 914 displayed in the mood message preview area 812 uses the same frame of the video as the thumbnail 822 shown in pane 818. If the user brings the pointer over the thumbnail image 914 in the mood message preview area 812 two buttons are displayed. The first button is a play button 916 that activates playback of the video to the user (in the same way as the play/pause button 904). The second button is a close button 918 that removes the thumbnail image 918 from the mood message preview area 812 and returns the display to the UI shown in FIG. 8 (in the same way as the close button 912).

The user can optionally add a text comment to complement the video in the mood message. This is done by the user clicking in region 920 of the mood message preview area 812 and typing a message. Alternatively, a description of the selected video provided by the content provider is placed in the region 920.

Once the user has chosen a video to include in their mood message, the user clicks save button 814 to save the video to their mood message and close the UI 800. Alternatively, the user can click the cancel button 816 to close the UI 800 without changing their mood message.

Figure 10A:
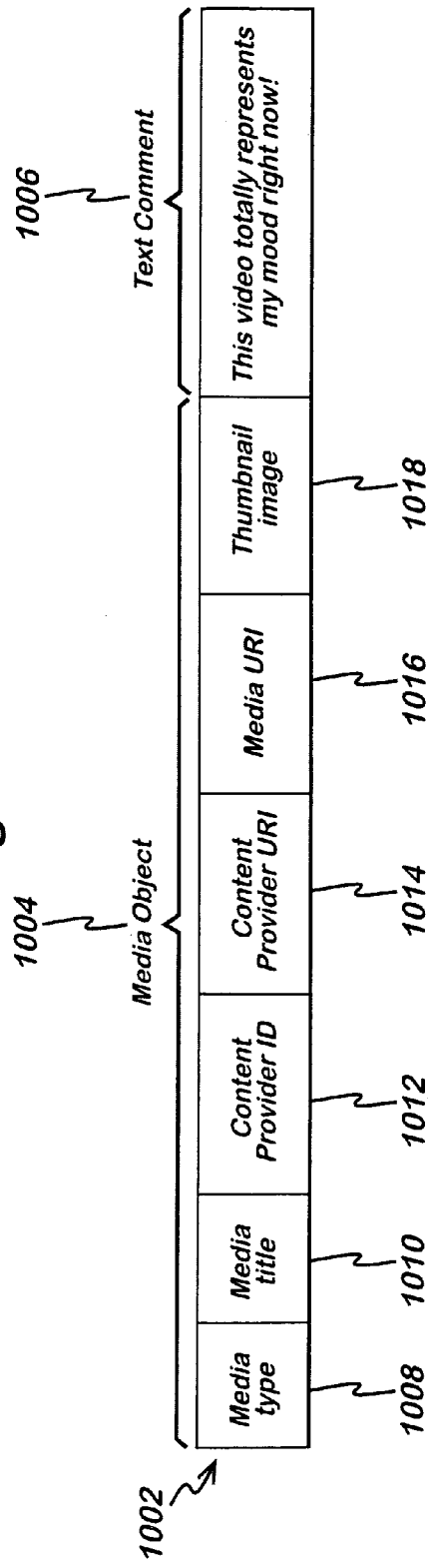
FIG. 10A shows mood message data.

Clicking the save button 814 following the selection of a video causes multimedia mood message data to be generated by the client 110. The mood message data 1002 that is generated by the client is illustrated in FIG. 10A. The mood message data 1002 that is generated and stored by the client comprises two main parts. The first part is a media object 1004, which contains the data related to the media (e.g. the video). The second part of the mood message data 1002 is the text comment 1006 that the user has typed to accompany the video (if present). Preferably, the mood message data 1002 is in the form of an extensible markup language ("XML") object, and the the media object 1004 is an XML structure within the mood message data 1002.

The media object 1004 comprises several data items. A media type field 1008 defines the type of media (e.g. video, photo, audio etc.) A media title field 1010 includes the title of the media (e.g. the title 824 in FIG. 8). A content provider identity 1012 is used to identify which content provider the media originated from. A content provider uniform resource identifier ("URI") provides an address of where further information may be found regarding the partner (e.g. the address of the partner webpage). A media URI is the address of where the media is stored, and this is the address from where the media is streamed when it is played. The thumbnail image for the media is stored in the media object at 1018. Preferably, the thumbnail image is provided by the content provider.

Figure 10B:
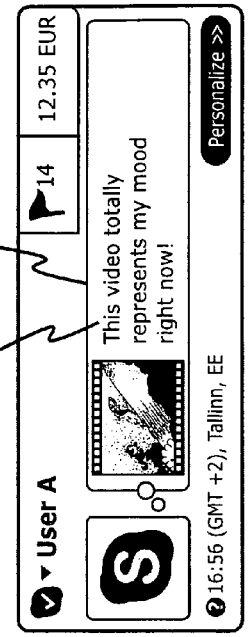
FIGS. 10B and 10C show a multimedia mood message in the client user interface.
Figure 10C:
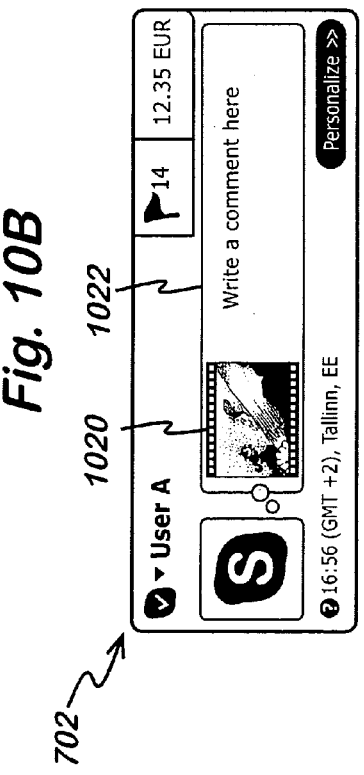

The multimedia mood message then appears to the user in the client UI as shown in FIGS. 10B and 10C. FIG. 10B shows the same panel 702 of the client UI as illustrated in FIG. 7A. However, the panel 702 now includes the thumbnail image 1020 for the video selected by the user (this is read from the thumbnail image 1018 in the media object 1004, and preferably this is the same thumbnail image as 914 in FIG. 9). The user also has the option to add a text comment at this stage to accompany the video (if this was not done previously, or if the user wishes to amend a previously entered comment). This is achieved by the user clicking in the text-entry region 1022 and typing. FIG. 10C illustrates the case where the user has typed a message 1024 in region 1022.

In an alternative embodiment, the user can also add a video to his mood message without using the video selection UI shown in FIGS. 8 and 9. For example, the user can copy and paste a URL of a video on a webpage directly into his mood message (e.g. into the field illustrated in FIG. 4B). The client detects that this URL is linking to a video (or other type of media), and automatically generates the required multimedia mood message data 1002 (described with reference to FIG. 10A above) in order for the video mood message to be created for this video. In some embodiments, the client can also check that the video URL is from an approved partner (e.g. one of the content providers 130, 132, 134).

In a further alternative embodiment, the user can additionally add a video to his mood message by selecting a control displayed on the webpage of a content provider in association with a particular video. For example, the webpage of a content provider (130, 132, 134) can display videos that can be viewed by a user using a web-browser. The webpage displays an "add to mood" button in proximity with the videos, such that if the button is activated by the user, then data regarding the video is passed to the client to allow the client to generate the media object 1004. Therefore, the client can create a multimedia mood message in the same way as described previously, but without using the video selection UI shown in FIGS. 8 and 9.

In yet further embodiments, the user can also add videos from a webpage, even if the webpage is not from a content provider that displays a specific "add to mood" button as part of the webpage itself. The P2P software provider can provide plug-in software for the web-browser program that detects that the webpage being viewed contains an embedded video, and overlays an "add to mood" button in proximity to the video in the webpage. If the user selects the button, then data is passed to the client that allows the client to generate the media object 1004 in the same way as described above. In preferred embodiments, the client can check that the webpage is from an approved partner (e.g. one of the content providers 130, 132, 134) before permitting the video to be included in a mood message.

Therefore, at this stage, the user (in this case User A) has selected a video to be included in his mood message (via a content directory as shown in FIGS. 8 and 9, by pasting a URL into the mood message, or by selecting a button displayed on a webpage), and generated corresponding multimedia mood message data 1002. The next stage is for the multimedia mood message to be passed to User A's contacts such that they can view the video if desired.

Referring again to FIG. 1, the video message data 1002 as shown in FIG. 10A is transmitted from the client 110 to the clients of the contacts of User A over the P2P system. According to one embodiment, the multimedia mood message data 1002 for User A is retrieved periodically by the contacts of User A 102. For example, the client 124 of User B 114 (who is a contact of User A) may periodically request mood message information from each of its contacts, thereby requesting the mood message information from User A. The multimedia mood message information is transmitted from User A to User B responsive to such a request. In an alternative embodiment, the multimedia mood message data 1002 is transmitted to each of the contacts of User A as soon as the mood message is created or changed (i.e. it is pushed to the contacts immediately). In a further alternative embodiment, the multimedia mood message data 1002 is pushed to the contacts at periodic intervals.

As User B 114 is a contact of User A, the multimedia mood message data 1002 will be provided to the client 124 of User B over the P2P system. The multimedia mood message data must be processed by the client 124 before the mood message is displayed to User B. The client 124 reads the mood message data 1002 and analyses the media object 1004. For example, the client 124 will read the media type field 1008 to determine the type of media referred to in the media object 1004 (e.g. a video in this example). The client will also extract the thumbnail 1018 so that it may be displayed in the UI of the client 124 next to the contact entry for User A. The media URI 1016 is extracted and hyperlinked to the thumbnail image in the client UI. The media title 1010 is also read for display in the client UI.

Figure 11A:
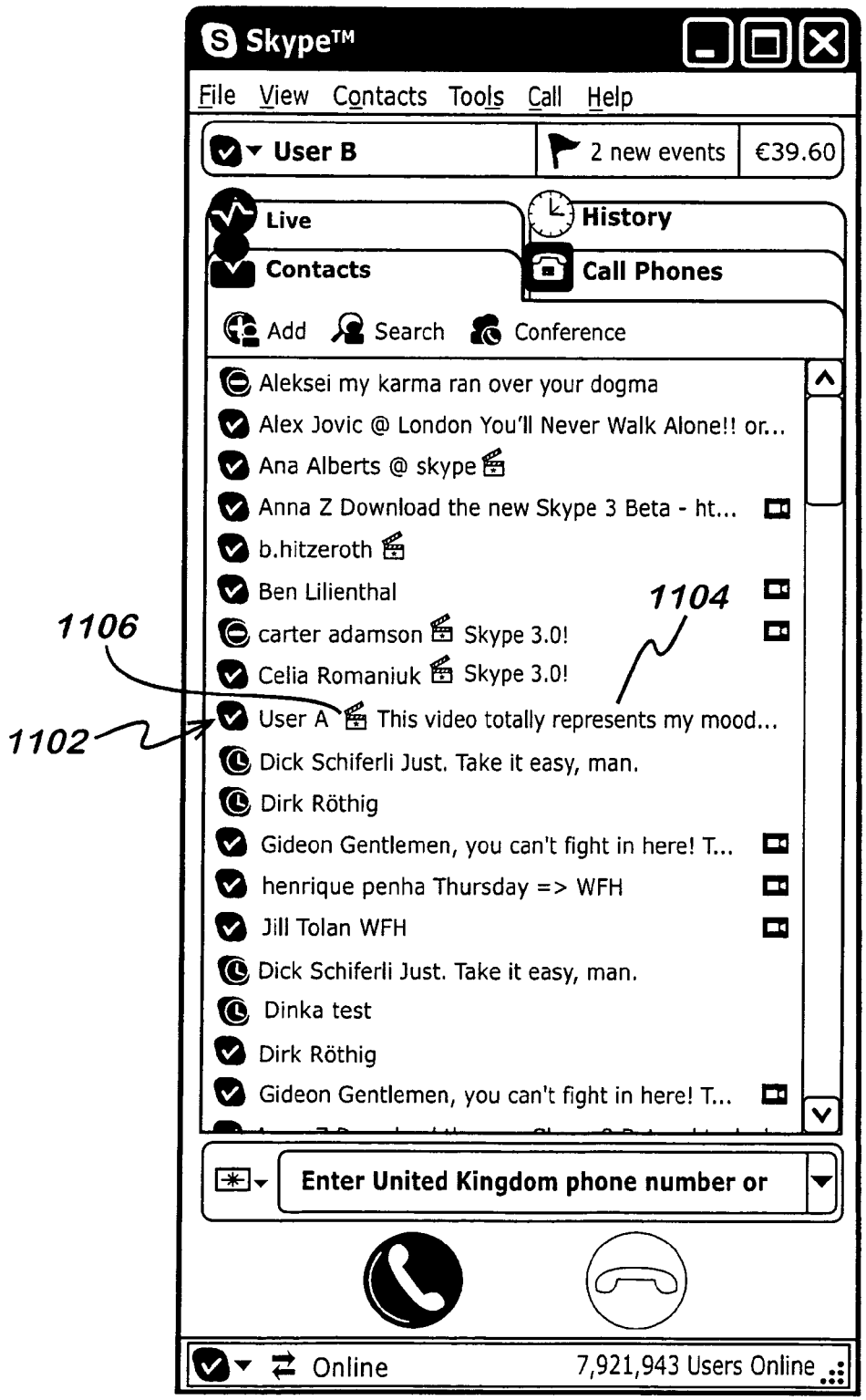
FIGS. 11A to 11D show multimedia mood message data displayed in User B's client.

The result of the multimedia mood message data 1002 being displayed in User B's client is illustrated in FIGS. 11A-11D. FIG. 11A shows the client UI 600 for User B (as shown previously in FIG. 6) with the contact for User A 1102 minimised. The entry 1102 for User A not only shows a text mood message (the text comment 1006 entered by the user as shown in FIG. 10A) but also displays an icon 1106 to indicate to User B that this is a multimedia mood message.

Figure 11B:
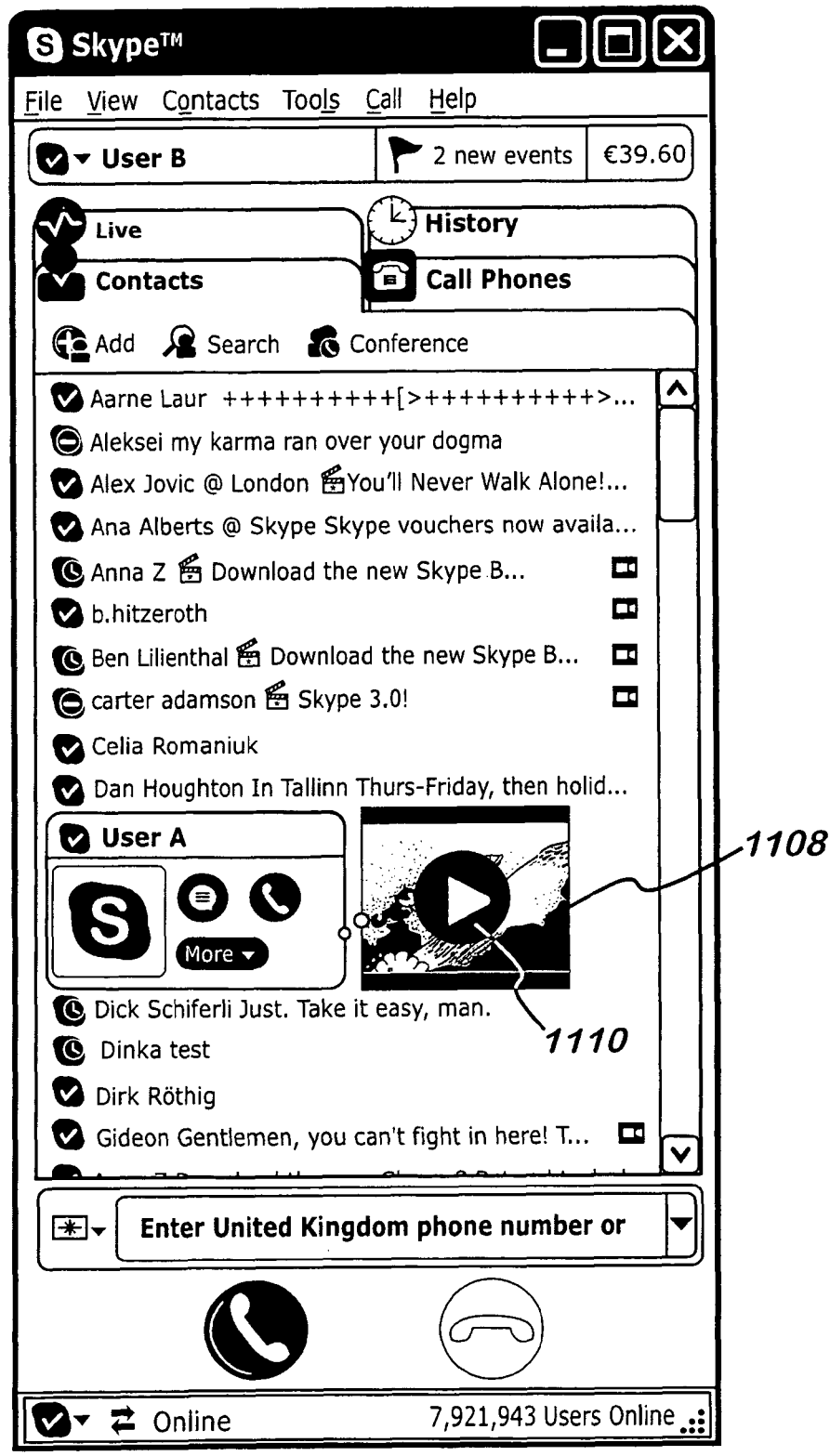
Figure 11C:
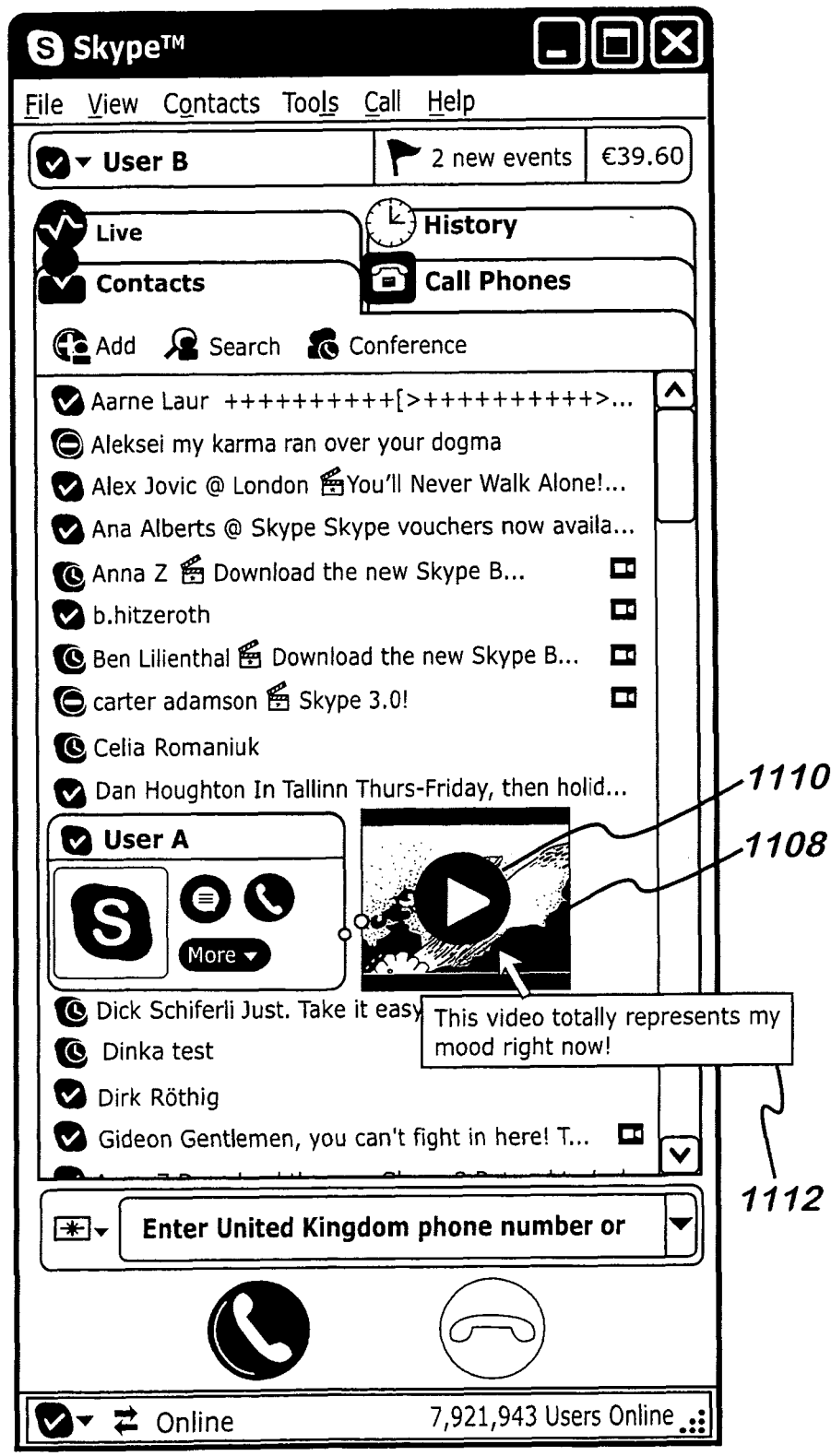
Figure 11D:
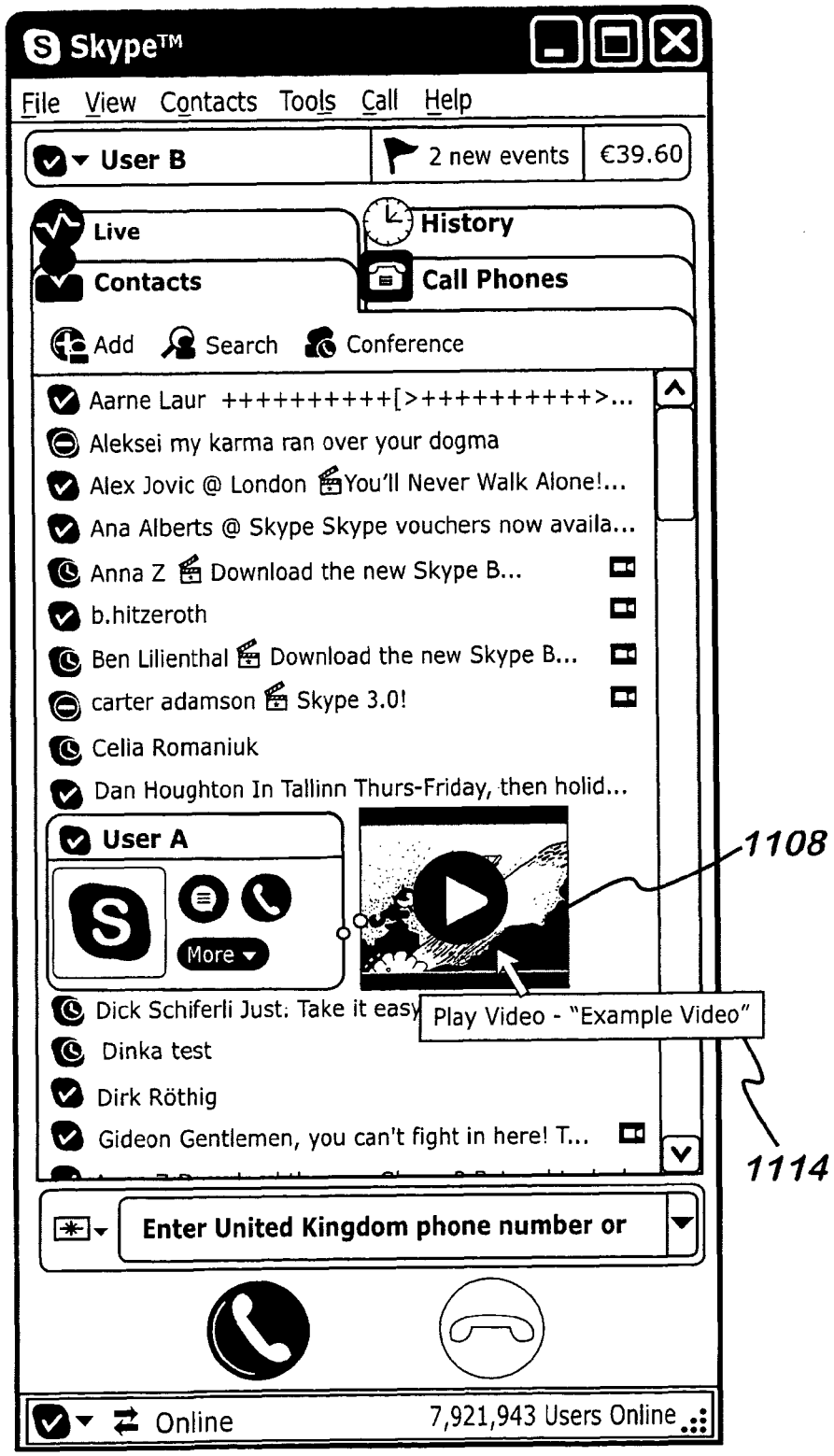

If User B clicks on the contact for User A, then the contact entry is expanded as shown in FIG. 11B. Compared to FIG. 6, this illustrates that the text part of the mood message has been replaced with a thumbnail image 1108 of the video, extracted from the thumbnail field 1018 of the multimedia mood message data 1002. The thumbnail image 1108 also has a play button 1110 overlaid on it, to indicate to the user that the video can be played by clicking on the thumbnail image 1108. If User B uses his pointing device to place a pointer over the thumbnail image 1108, then the text comment provided with the video (if any) is displayed in a box 1112 as illustrated in FIG. 11C. Alternatively, if no text comment has been provided, the title of the video is displayed in a box 1114, as illustrated in FIG. 11D.

The amount of mood message information that can be displayed in the client UI depends on the width of the client UI as shown on the display. This is determined by the user of the client. FIG. 12 illustrates contact information from a portion of the client UI with different widths. The example shown in 1202 illustrates the case where there is no mood message for User A and a narrow client width. The example shown in 1204 illustrates the case where there is a video mood message and a narrow client width. Similarly, example 1206 illustrates a text-based mood message for a narrow client. Example 1208 illustrates a wide client width for a video mood message, where further contact information (such as telephone numbers) can now be displayed in addition to the thumbnail image. Example 1210 illustrates an even wider client window, where both the thumbnail and the text comment can be displayed side-by-side.

If User B wishes to view the video from the mood message, then he uses the pointing device to click on the thumbnail image 1108. The thumbnail image 1108 is hyperlinked with the media URI 1016 from the multimedia mood message data 1002.

However, in preferred embodiments, before the video is displayed to User B, the client 124 will perform a check to ensure that the media URI 1016 included in the mood message does not relate to a video that has been "blacklisted". A video may be blacklisted if, for example, it is found to infringe copyright or contains offensive material. Referring to FIG. 1, a blacklist advertiser 136 is shown connected to network 106, and connected to the blacklist advertiser is a blacklist database 138. Note that the blacklist database can be a centralised database or a distributed P2P database. If any videos are "blacklisted", then the address (i.e. media URI) of the video is stored in the blacklist DB 138. When a user attempts to access a given media URI, the client first sends a message to the blacklist advertiser 136 containing the media URI. The blacklist advertiser 136 compares the media URI sent by the client with those listed in the blacklist DB 138.

If the media URI matches one listed in the blacklist DB 138, then blacklist advertiser 136 sends a message to the client indicating that the video has been blacklisted. In response to this the client does not display the media, but instead displays a notification of the problem. Conversely, if the media URI 1016 is not listed in the blacklist DB 138, then the blacklist advertiser 136 sends a message to indicate to the client that the media can be displayed to the user.

After User B clicks on the hyperlinked thumbnail image in the mood message of User A (1108 in FIG. 11B-D), and the client has received a message from the blacklist advertiser 136 indicating that the video can be viewed, the client 124 launches a window to play the video to User B.

The video playback window 1300 is shown in FIG. 13. The video playback window 1300 displays a contact card 1302 to indicate to the user which contact the video has come from. The contact card 1302 also includes buttons to initiate a voice call 1304 and start an IM chat with the contact 1306. The video is shown in a video display region 1308, and is controlled using a bar at the bottom of the video that comprises a play/pause button 1310, a progress bar 1312, a sound control button 1314 and menu button 1316. The title 1318 of the video is shown above the video, and any text comment 1320 accompanying the video in the mood message is displayed below the video. Preferably, the user can increase the size of the video to fill the display screen by bringing the pointer over the corner of the video display region 1308 and activating button 1322. Two buttons are present at the bottom of the video playback window 1300. The first is an "Add to My Mood" button 1324, which allows User B to add the video currently being shown to his own mood message. This is described in more detail with reference to FIG. 14 below. The second button is a "Chat About This" button 1326. When the "Chat About This" button 1326 is activated, a dialogue box is opened that displays to User B a list of all his contacts. User B can select from this list the contacts with which he wishes to initiate an IM chat conversation. When he has selected the contacts, an IM chat session is established with these contacts, and the video from the video playback window 1300 is automatically inserted into the beginning of the IM chat conversation.

In order to show the video in the video playback window 1300, the client 124 uses the media URI 1016 from the multimedia mood message data 1002 for the video embedded in User A's mood message to communicate with the content provider 130 and access the video referred to in the media URI 101604. The video located at the address 1004 is played from where it is stored at the content provider 130, and the video data is streamed to the user terminal 122 over the network 106. Preferably, the video is provided in real time to the client 124 from the content provider 130 using the hypertext transfer protocol ("HTTP").

Preferably, when the video has finished playing to the user, either an advertisement is displayed to the user, or promotions to other videos are shown. If the user clicks on a promoted video, then he is displayed a video selection UI (similar to that illustrated in FIGS. 8 and 9) where the promoted videos are shown, and the user can preview them and add them to his own mood message if desired. If the user clicks on an advertisement, then a web-browser is executed at the user terminal which displays a webpage related to the advertisement.

If User B decides that he would like to have the same video as User A in his mood message, then User B can click the "Add to My Mood" button 1324 in the video playback window 1300. When this button is activated, the user is displayed mood message creation window 1400 shown in FIG. 14. This window 1400 shows the video to be added to the mood message, which the user can playback again if required. The source and title 1402 of the video is shown above the video. A mood message preview area 1404 is shown at the bottom of window 1400 to indicate to the user how the video will appear in their mood message. The mood message preview area 1404 shows a thumbnail image 1406 of the video and a text-comment entry area 1408. Alternatively, the title of the video is placed in the area 1408. If the user wishes to add the video to his mood message, he clicks on "Save Mood Message" button 1410. Alternatively, he can cancel the process without changing his mood message by clicking "Cancel" button 1412. If the user chooses to save the mood message, the subsequent process is the same as that described above with reference to FIGS. 10A-C.

Note that in alternative embodiments, the video does not need to be played to the user in a video playback window such as that shown in FIG. 13. Instead, the client can have a video player integrated into the contact card display. For example, referring to FIG. 11B, if the user clicks on the play button 1110 for the video 1108, the video can play directly in the mood message of the contact in the client, without opening a pop-up window. In other words, rather than only a still thumbnail being shown in the mood message in the contact list, the actual video itself can also be played in the mood message.

Referring again to FIG. 1, in preferred embodiments a statistics server 140 is connected to network 106, and connected to the statistics server is a statistics DB 142. The statistics DB 142 is used to store statistics related to the videos that are being used in mood messages by the users of the system. In particular, whenever a video is added to a mood message, a message is sent to the statistics server 140 indicating which video is being included in a mood message. The statistics server 140 processes this message and stores the information in the statistics DB 142. This allows the P2P software provider to access information on which videos are the most popular in mood messages. More preferably, the message sent to the statistics server 140 can indicate whether the video added to the mood message was chosen by the user as described above with regards to FIGS. 8 and 9 (i.e. from the content provider selection display), or whether the video was added after watching another user's mood message video as described with reference to FIG. 14. This information allows the P2P software provider to determine which videos are most widely shared between the individual users of the system. In further embodiments, more detailed information regarding the videos can also be sent to the statistics server 140. For example, this can comprise metadata attached to the content, which describes what the video shows (e.g. for a music video the metadata can contain the type of music, the artist and track title). This information can be used to provide a more accurate description of the media being inserted into mood messages.

While this invention has been particularly shown and described with reference to preferred embodiments, it will be understood to those skilled in the art that various changes in form and detail may be made without departing from the scope of the invention as defined by the appendant claims.

For example, it will be understood by those skilled in the art that still photos or audio clips/recordings could be incorporated into mood messages in a similar manner as the videos in the above-described embodiment. Furthermore, it will also be understood by those skilled in the art that, whilst the above-described embodiment has been illustrated with reference to a peer-to-peer communication system, other types of communication system could also be used, such as instant messaging systems and other, non-P2P, VoIP systems.

What is claimed is:

1. A user terminal connected to a communication network and executing a communication client, comprising:
   the client having an instant messaging interface configured to facilitate handling voice over internet protocol (VoIP) communications using the communication network;
   the client configured to display, at the VoIP instant messaging interface, a list of contacts associated with a user of said client;
   the client configured to facilitate VoIP communication via the VoIP instant messaging interface with one or more of said contacts displayed in said list of contacts;
   the client configured to retrieve a message from said communication network, wherein said message is related to a further user represented by one of said contacts displayed in said list of contacts, said message comprising a reference to media stored in a computer readable storage accessible by said communication network;
   the client configured to extract said reference from said message;
   the VoIP instant messaging interface configured to display a visual representation of said media in association with said one of said contacts in response to a selection of said one of said contacts from the list of contacts, the visual representation having a reduced file size as compared with said media, where the visual representation includes a media object which defines an address where the media is stored, such that, responsive to the user actuating said visual representation in connection with the VoIP instant messaging interface, the client establishes communication with said storage using said reference, and displays the media to said user; and
   a media player executed under the control of said client, where said media is displayed to said user using said media player, said media being displayed at the location of said visual representation.

2. The user terminal according to claim 1, wherein said media is a video.

3. The user terminal according to claim 2, wherein said visual representation is a thumbnail image.

4. The user terminal according to claim 3, wherein said message comprises said thumbnail image.

5. The user terminal according to claim 2, wherein said visual representation is a resized video.

6. The user terminal according to claim 1, wherein said media is an image.

7. The user terminal according to claim 1, wherein said media is an audio recording.

8. The user terminal according to claim 1, further comprising means for downloading the list of contacts from a network element.

9. The user terminal according to claim 1, wherein the message is retrieved from a client executed at a user terminal of the further user.

10. The user terminal according to claim 9, wherein said message is a mood message created by said further user.

11. The user terminal according to claim 10, wherein said mood message is created by said further user selecting said media from a page displaying a list of available media.

12. The user terminal according to claim 11, wherein said list of available media is provided by at least one content provider over said communication network.

13. The user terminal according to claim 10, wherein said mood message is created by said further user entering an address of a webpage into the client executed at the user terminal of the further user.

14. The user terminal according to claim 10, wherein said mood message is created by said further user actuating a button displayed on a webpage.

15. The user terminal according to claim 1, wherein said message further comprises user-readable text data.

16. The user terminal according to claim 15, wherein said user-readable text data is entered by said further user.

17. The user terminal according to claim 1, wherein a user interface of said media player is displayed to said user in a pop-up window.

18. The user terminal according to claim 1, wherein said media player displays a first control, such that actuation of said first control by said user causes the reference to said media to be added to a mood message for said user.

19. The user terminal according to claim 1, wherein said media player displays a second control, such that actuation of said second control by said user causes an instant messaging session to be established between the user and at least one other user over said communication network.

20. The user terminal according to claim 1, further comprising means for ascertaining whether said reference to said media is listed in a database prior to displaying said media.

21. The user terminal according to claim 20, wherein if said reference to said media is listed in said database, said user terminal does not display said media.

22. The user terminal according to claim 1, wherein said reference is a network address of said media.

23. The user terminal according to claim 22, wherein said network address is a uniform resource identifier.

24. The user terminal according to claim 1, wherein said communication network is a packet based communication network.

25. The user terminal according to claim 1, wherein said communication client is a voice over internet protocol communication client.

26. The user terminal according to claim 25, wherein said voice over internet protocol communication client is a peer-to-peer communication client.

27. The user terminal according to claim 1, wherein said communication client is an instant messaging communication client.

28. The user terminal according to claim 1, wherein said user terminal is a personal computer.

29. The user terminal according to claim 1, wherein said user terminal is a mobile device.

30. A method of distributing a message from a first user terminal to at least one other user terminal connected via a communication network, comprising:
   using an instant messaging user interface of a first communication client executed on said first user terminal, facilitating voice over internet protocol (VoIP) communications via the communication network;
   generating the message at the first communication client, said message comprising a reference to media stored in a computer readable storage accessible by said communication network;
   said at least one further user terminal executing a second communication client;
   said second client retrieving said message from said first communication client over said communication network and extracting said reference from said message;
   said second client displaying a list of contacts associated with a user of said at least one further user terminal, a user of the first user terminal being represented by one of said contacts in said list of contacts;
   said second client displaying a visual representation of said media in association with an identity of a user of the first user terminal in response to a selection of said user of the first user terminal from the list of contacts, the visual representation having a reduced file size as compared with said media, where the visual representation includes a media object which defines an address where the media is stored;
   responsive to a user of said at least one further user terminal actuating said visual representation, said second client establishing communication with said storage using said reference and displaying the media using a media player executed under the control of said client, said media being displayed at the location of said visual representation; and
   responsive to a selection by the user of said at least one further user terminal to initiate VoIP communication with said user of the first user terminal, said second client facilitating VoIP communication with said user of the first user terminal.

31. The method according to claim 30, wherein said media is a video.

32. The method according to claim 31, wherein said visual representation is a thumbnail image.

33. The method according to claim 32, wherein said message comprises said thumbnail image.

34. The method according to claim 31, wherein said visual representation is a resized video.

35. The method according to claim 30, wherein said media is an image.

36. The method according to claim 30, wherein said media is an audio recording.

37. The method according to claim 30, further comprising the step of said second client displaying a list of contacts associated with a user of said at least one further user terminal.

38. The method according to claim 37, further comprising the step of said second client downloading the list of contacts from a network element.

39. The method according to claim 30, wherein said message is a mood message.

40. The method according to claim 39, wherein said step of generating said message further comprises the user of the first user terminal entering an address of a webpage into the first communication client executed on said first user terminal.

41. The user terminal according to claim 39, wherein said step of generating said message further comprises the user of the first user terminal actuating a button displayed on a webpage.

42. The method according to claim 30, wherein said step of generating said message further comprises the user of the first user terminal selecting said media from a page displaying a list of available media.

43. The method according to claim 42, further comprising the step of said first client transmitting a notification of said reference to said media to a network node over said communication network following said step of selecting said media.

44. The method according to claim 42, wherein said list of available media is provided by at least one content provider over said communication network.

45. The method according to claim 30, wherein said message further comprises user-readable text data.

46. The method according to claim 45, wherein said step of generating the message further comprises said user of the first user terminal entering user-readable text data.

47. The method according to claim 30, wherein a user interface of said media player is displayed to said user of said at least one further user terminal in a pop-up window.

48. The method according to claim 47, wherein said step of said second client displaying the media further comprises said media player displaying a first control, such that actuation of said first control by said user causes the reference to said media to be added to a mood message for said user.

49. The method according to claim 47, wherein said step of said second client displaying the media further comprises said media player displaying a second control, such that actuation of said second control by said user causes an instant messaging session to be established between the user and at least one other user over said communication network.

50. The method according to claim 30, further comprising the step of said second client ascertaining whether said reference to said media is listed in a database prior to the step of displaying said media.

51. The method according to claim 30, wherein said reference is a network address of said media.

52. The method according to claim 51, wherein said network address is a uniform resource identifier.

53. The method according to claim 30, wherein said communication network is a packet based communication network.

54. The method according to claim 30, wherein said communication client is a voice over internet protocol communication client.

55. The method according to claim 54, wherein said voice over internet protocol communication client is a peer-to-peer communication client.

56. The method according to claim 30, wherein said communication client is an instant messaging communication client.

57. The method according to claim 30, wherein said user terminal is a personal computer.

58. The method according to claim 30, wherein said user terminal is a mobile device.

59. A system comprising:
a first user terminal connected to a communication network, the first user terminal configured to execute a first communication client, the first communication client configured to generate a message, said message comprising a reference to media stored in a computer readable storage accessible by said communication network, the first communication client configured to transmit said message over said communication network, and the first communication client configured to use an instant messaging user interface to facilitate handling of voice over internet protocol (VoIP) calls via the communication network; and
at least one further user terminal connected to the communication network, the at least one further user terminal configured to execute a second communication client, the second communication client configured to retrieve said message from said first communication client over said communication network, the second communication client configured to use an instant messaging user interface to facilitate handling of voice over internet protocol (VoIP) calls via the communication network, the second communication client configured to extract said reference from said message, the second communication client configured to retrieve configured to display a list of contacts associated with a user of said at least one further user terminal, a user of the first user terminal being represented by one of said contacts in said list of contacts; and
a media player configured to display a visual representation of said media in association with an identity of a user of the first user terminal in response to a selection of said user of the first user terminal from the list of contacts, the visual representation having a reduced file size as compared with said media, where the visual representation includes a media object which defines an address where the media is stored, such that, responsive to a user of said at least one further user terminal actuating said visual representation, the client establishes communication with said storage using said reference and displays the media to said user, the media player executed under the control of said client, where said media is displayed using said media player, said media being displayed at the location of said visual representation.

60. A method of displaying a message at a user terminal connected to a communication network and executing a communication client, comprising:
using an instant messaging user interface of said client, displaying a list of contacts associated with a user of said client;
said client facilitating voice over internet protocol (VoIP) calls via the communication network with one or more of said contacts displayed in said list of contacts;
said client retrieving a message from said communication network, wherein said message is related to a further user represented by one of said contacts displayed in said list of contacts, said message comprising a reference to media stored in a computer readable storage accessible by said communication network;
extracting said reference from said message; and
using the instant messaging user interface, displaying a visual representation of said media in association with said one of said contacts in response to a selection of said further user from the list of contacts, the visual representation having a reduced file size as compared with said media, where the visual representation includes a media object which defines an address where the media is stored, such that, responsive to the user actuating said visual representation, the client establishes communication with said storage using said reference and displays the media to said user, where said media is displayed using a media player that is executed under the control of said client, said media being displayed at the location of said visual representation.

61. A computer program product comprising a non-transitory computer useable medium having program code which when executed by a computer cause the computer to:
using an instant messaging user interface, display a list of contacts associated with a user;
direct voice over internet protocol (VoIP) calls using a communication network with one or more of contacts displayed in said list of contacts;
retrieve a message from the communication network, wherein said message is related to a further user represented by one of said contacts displayed in said list of contacts, said message comprising a reference to media stored in a computer readable storage accessible by said communication network;
extract said reference from said message;
display a visual representation of said media in association with said one of said contacts in response to a selection of said further user from the list of contacts, the visual representation having a reduced file size as compared with said media, where the visual representation includes a media object which defines an address where the media is stored; and
responsive to the user actuating said visual representation, establish communication with said storage using said reference and display the media to said user, where said media is displayed using a media player that is executed under the control of said client, said media being displayed at the location of said visual representation.

* * * * *